US012777427B2

(12) United States Patent
Li et al.

(10) Patent No.: US 12,777,427 B2
(45) Date of Patent: Oct. 27, 2026

(54) POWER CONTROL METHOD AND APPARATUS

(71) Applicant: HUAWEI TECHNOLOGIES CO., LTD., Shenzhen (CN)

(72) Inventors: Yiran Li, Beijing (CN); Jiafeng Shao, Beijing (CN); Jian Yu, Beijing (CN); Wenqi Zhao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 306 days.

(21) Appl. No.: 18/439,830

(22) Filed: Feb. 13, 2024

(65) Prior Publication Data

US 2024/0259955 A1 Aug. 1, 2024

Related U.S. Application Data

(63) Continuation of application No. PCT/CN2022/112322, filed on Aug. 12, 2022.

(30) Foreign Application Priority Data

Aug. 13, 2021 (CN) ......................... 202110932074.9

(51) Int. Cl.
*H04W 52/24* (2009.01)

(52) U.S. Cl.
CPC ....... *H04W 52/242* (2013.01); *H04W 52/246* (2013.01)

(58) Field of Classification Search
CPC ............. H04W 52/242; H04W 52/246; H04W 52/283; H04W 52/346; H04W 52/367; G01S 7/006
See application file for complete search history.

(56) References Cited

U.S. PATENT DOCUMENTS

2022/0260709 A1* 8/2022 Lee ........................ H04W 52/02

FOREIGN PATENT DOCUMENTS

| | | | | | |
|---|---|---|---|---|---|
| CN | 104349437 | A | | 2/2015 | |
| CN | 111465090 | A | * | 7/2020 | .......... H04W 52/245 |
| CN | 113156389 | A | | 7/2021 | |
| JP | 2014523658 | A | * | 9/2014 | ............ H04W 24/00 |
| WO | WO-2015059834 | A1 | * | 4/2015 | .......... H04W 52/383 |

(Continued)

OTHER PUBLICATIONS

3GPP TS 38.101-1, "3rd Generation Partnership Project; Technical Specification Group Radio Access Network; NR; User Equipment (UE) Radio Transmission and Reception; Part 1: Range 1 Standalone (Release 17)", 3GPP Organizational Partners, Jun. 2021, V17.2.0, 536 pages.

(Continued)

*Primary Examiner* — Curtis A Kuntz
(74) *Attorney, Agent, or Firm* — Maier & Maier, PLLC

(57) ABSTRACT

A power control method and apparatus, to implement power control on a sensing signal, thereby ensuring sensing performance of a terminal device, and improving sensing precision. The method includes: the terminal device determines a first path loss, determines a transmit power of a first signal based on the first path loss, and sends the first signal based on the transmit power. The first path loss is a path loss of a detection link, and the detection link is a round-trip link between the terminal device and at least one object.

18 Claims, 5 Drawing Sheets

(56) References Cited

FOREIGN PATENT DOCUMENTS

| | | | |
|---|---|---|---|
| WO | 2020249314 | A1 | 12/2020 |
| WO | 2021011967 | A1 | 1/2021 |

OTHER PUBLICATIONS

3GPP TS 38.101-2, "3rd Generation Partnership Project; Technical Specification Group Radio Access Network; NR; User Equipment (UE) Radio Transmission and Reception; Part 2: Range 2 Standalone (Release 17)", 3GPP Organizational Partners, Jun. 2021, V17.2.0, 188 pages.

3GPP TS 38.101-3, "3rd Generation Partnership Project; Technical Specification Group Radio Access Network; NR; User Equipment (UE) Radio Transmission and Reception; Part 3: Range 1 and Range 2 Interworking Operation with Other Radios (Release 15)", 3GPP Organizational Partners, Jun. 2021, V15.14.0, 185 pages.

3GPP TS 38.211, "3rd Generation Partnership Project; Technical Specification Group Radio Access Network; NR; Physical Channels and Modulation (Release 16)", 3GPP Organizational Partners, Jun. 2021, V16.6.0, 134 pages.

3GPP TS 38.213, "3rd Generation Partnership Project; Technical Specification Group Radio Access Network; NR; Physical Layer Procedures for Control (Release 16)", 3GPP Organizational Partners, Jun. 2021, V16.6.0, 187 pages.

3GPP TS 38.331, "3rd Generation Partnership Project; Technical Specification Group Radio Access Network; NR; Radio Resource Control (RRC) Protocol Specification (Release 16)", 3GPP Organizational Partners, Jun. 2021, V16.5.0, 959 pages.

* cited by examiner

POWER CONTROL METHOD AND APPARATUS

CROSS-REFERENCE TO RELATED APPLICATIONS

This application is a continuation of International Application No. PCT/CN2022/112322, filed on Aug. 12, 2022, which claims priority to Chinese Patent Application No. 202110932074.9, filed on Aug. 13, 2021. The disclosures of the aforementioned applications are hereby incorporated by reference in their entireties.

TECHNICAL FIELD

The embodiments relate to the communication field and to a power control method and apparatus.

BACKGROUND

With the progress of science and technology and continuous enhancement of functions of terminal devices, a terminal device having a sensing function has appeared in people's daily life and is widely used. For example, in a scenario such as environment quality detection, noise monitoring, or road traffic conditions detection, the terminal device having a sensing function may sense a target device by sending a sensing signal at a specific transmit power and receiving an echo signal for the sensing signal, and estimate sensing information. The sensing information may include a speed, a distance, a moving track, a shape, a size, and the like of the sensed target device.

In the conventional technology, no specific solution of power control for a sensing signal is proposed. Therefore, how to perform power control on the sensing signal is a problem that needs to be urgently resolved.

SUMMARY

The embodiments provide a power control method and apparatus, to implement power control on a sensing signal, thereby ensuring sensing performance of a terminal device, and improving sensing precision.

To achieve the foregoing objective, the embodiments use the following solutions.

According to a first aspect, a power control method is provided. The power control method includes: a terminal device determines a first path loss, determines a transmit power of a first signal based on the first path loss, and sends the first signal based on the transmit power. The first path loss is a path loss of a detection link, and the detection link is a round-trip link between the terminal device and at least one object.

According to the power control method according to the first aspect, the terminal device determines the transmit power of the first signal based on the path loss of the detection link. The detection link is the round-trip link between the terminal device and the at least one object. In a target detection process, after the terminal device sends a signal, the signal may pass through one sensing target and then be reflected to the terminal device, or the signal may sequentially pass through a plurality of sensing targets and then be reflected to the terminal device. In this way, the transmit power of the first signal is determined based on the path loss of the detection link, and the first signal is sent based on the determined transmit power. This can ensure sensing performance of the terminal device, and improve sensing precision.

In a possible manner, the first path loss may be determined by the terminal device based on first information, a signal from the terminal device, and/or a signal from a device other than the terminal device, where the first information includes one or more of the following: reference path loss information, a first path loss correction value, or distance information. Optionally, the first information may be from a network device or another terminal device.

Optionally, the signal from the terminal device may be from the terminal device at one or more transmission opportunities before a current transmission opportunity. For example, the one or more transmission opportunities are one or more transmission opportunities of a sensing signal.

Optionally, the terminal device may determine the first path loss based on a power of the received signal from the device other than the terminal device.

In a possible manner, that the first path loss is determined by the terminal device by using a signal from the terminal device may include: the first signal is transmitted at a transmission opportunity $T_0$, the first path loss may be determined based on a path loss obtained at one or more transmission opportunities before the transmission opportunity $T_0$, and the path loss is a path loss of the round-trip link between the terminal device and the at least one object.

In a possible manner, the determining a transmit power of a first signal based on the first path loss includes: determining the transmit power of the first signal based on first power control indication information and the first path loss, where the first power control indication information may include a first maximum transmit power and a first expected transmit power, the first maximum transmit power may indicate a maximum power for sending the first signal, the first maximum transmit power is less than or equal to a maximum transmit power of the terminal device, the transmit power of the first signal is less than or equal to the first maximum transmit power, and the first expected transmit power may indicate an expected transmit power that meets a target detection requirement of the terminal device. In this way, the transmit power of the first signal may be determined under the constraint of the first maximum transmit power of the terminal device, to implement power control on a sensing signal, thereby ensuring sensing performance of the terminal device.

In a possible manner, the power control method according to the first aspect may further include: receiving first indication information from the network device, where the first indication information may include the first power control indication information.

In a possible manner, the first indication information may further include second power control indication information, and the second power control indication information may indicate a transmit power of a second signal. In this way, power control on the second signal can be implemented, and the second signal may be a communication signal or a sensing signal.

In a possible manner, the first power control indication information may further indicate a transmit power of a second signal. For the first signal and the second signal that are on an overlapped time domain resource in spatial division multiplexing, the first power control indication information may jointly indicate power control parameters of the first signal and the second signal, thereby reducing resource overheads.

In a possible manner, a time domain resource of the first signal and a time domain resource of the second signal completely or partially overlap, and on the overlapped time domain resource, a sum of the transmit power of the first signal and the transmit power of the second signal is less than or equal to the maximum transmit power of the terminal device. In this way, a transmit power of a sensing signal and a transmit power of a communication signal can be properly allocated.

In a possible manner, the first indication information may further include first time domain resource configuration information and second indication information, the first time domain resource configuration information may indicate the time domain resource of the first signal, and the second indication information may indicate that resource configuration information of the second signal is the same as the first time domain resource configuration information. In this way, when a time domain resource configuration of the first signal and a time domain resource configuration of the second signal completely overlap, the resource configuration information of the second signal may not be separately sent to the terminal device, thereby reducing resource overheads.

According to a second aspect, a power control method is provided. The power control method includes: a network device determines first indication information, and sends the first indication information to a terminal device. The first indication information includes first power control indication information, the first power control indication information is for the terminal device to determine a transmit power of a first signal based on the first power control indication information and a first path loss, the first path loss is a path loss of a detection link, and the detection link is a round-trip link between the terminal device and at least one object.

In a possible manner, the power control method according to the second aspect may further include: sending first information to the terminal device, where the first information may include one or more of the following: reference path loss information, a first path loss correction value, or distance information, and the first information may indicate the first path loss.

In a possible manner, the first power control indication information may include a first maximum transmit power and a first expected transmit power, the first maximum transmit power may indicate a maximum power for sending the first signal, the first maximum transmit power is less than or equal to a maximum transmit power of the terminal device, the transmit power of the first signal is less than or equal to the first maximum transmit power, and the first expected transmit power may indicate an expected transmit power that meets a target detection requirement of the terminal device.

In a possible manner, the first indication information may further include second power control indication information, and the second power control indication information may indicate a transmit power of a second signal.

In a possible manner, the first power control indication information may further indicate a transmit power of a second signal.

In a possible manner, the first indication information may further include first time domain resource configuration information and second indication information, the first time domain resource configuration information may indicate a time domain resource of the first signal, and the second indication information may indicate that resource configuration information of the second signal is the same as the first time domain resource configuration information.

According to a third aspect, a power control apparatus is provided. The power control apparatus includes a processing module and a transceiver module. The processing module is configured to determine a first path loss. The processing module is further configured to determine a transmit power of a first signal based on the first path loss. The transceiver module is configured to send the first signal based on the transmit power. The first path loss is a path loss of a detection link, and the detection link is a round-trip link between a terminal device and at least one object.

In a possible manner, the first path loss may be determined by the terminal device based on first information, a signal from the terminal device, and/or a signal from a device other than the terminal device, where the first information includes one or more of the following: reference path loss information, a first path loss correction value, or distance information.

In a possible manner, that the first path loss is determined by the terminal device by using a signal from the terminal device may include: the first signal is transmitted at a transmission opportunity $T_0$, and the first path loss may be determined based on a path loss obtained at one or more transmission opportunities before the transmission opportunity $T_0$.

In a possible manner, the determining a transmit power of a first signal based on the first path loss may include: determining the transmit power of the first signal based on first power control indication information and the first path loss. The first power control indication information may include a first maximum transmit power and a first expected transmit power, the first maximum transmit power may indicate a maximum power for sending the first signal, the first maximum transmit power is less than or equal to a maximum transmit power of the terminal device, the transmit power of the first signal is less than or equal to the first maximum transmit power, and the first expected transmit power may indicate an expected transmit power that meets a target detection requirement of the terminal device.

In a possible manner, the transceiver module is further configured to receive first indication information from a network device, where the first indication information may include the first power control indication information.

In a possible manner, the first indication information may further include second power control indication information, and the second power control indication information may indicate a transmit power of a second signal.

In a possible manner, the first power control indication information may further indicate a transmit power of a second signal.

In a possible manner, a time domain resource of the first signal and a time domain resource of the second signal completely or partially overlap, and on the overlapped time domain resource, a sum of the transmit power of the first signal and the transmit power of the second signal is less than or equal to the maximum transmit power of the terminal device.

In a possible manner, the first indication information may further include first time domain resource configuration information and second indication information, the first time domain resource configuration information may indicate the time domain resource of the first signal, and the second indication information may indicate that resource configuration information of the second signal is the same as the first time domain resource configuration information.

It should be noted that the transceiver module in the third aspect may include a receiving module and a sending module. The receiving module is configured to receive data and/or signaling from the network device. The sending module is configured to send data and/or signaling to the network device. A specific implementation of the transceiver module is not limited.

Optionally, the power control apparatus according to the third aspect may further include a storage module, and the storage module stores a program or instructions. When the processing module executes the program or the instructions, the power control apparatus according to the third aspect can perform the method according to the first aspect.

It should be noted that the power control apparatus according to the third aspect may be a terminal device, or may be a chip (system) or another component or component that may be disposed in the terminal device. This is not limited.

In addition, for an effect of the power control apparatus according to the third aspect, refer to the effect of the power control method according to any one of the possible implementations of the first aspect. Details are not described herein again.

According to a fourth aspect, a power control apparatus is provided. The power control apparatus includes a processing module and a transceiver module. The processing module is configured to determine first indication information. The transceiver module is configured to send the first indication information to a terminal device. The first indication information includes first power control indication information, the first power control indication information is for the terminal device to determine a transmit power of a first signal based on the first power control indication information and a first path loss, the first path loss is a path loss of a detection link, and the detection link is a round-trip link between the terminal device and at least one object.

In a possible manner, the transceiver module is further configured to send first information to the terminal device, where the first information may include one or more of the following: reference path loss information, a first path loss correction value, or distance information, and the first information may indicate the first path loss.

In a possible manner, the first power control indication information may include a first maximum transmit power and a first expected transmit power, the first maximum transmit power may indicate a maximum power for sending the first signal, the first maximum transmit power is less than or equal to a maximum transmit power of the terminal device, the transmit power of the first signal is less than or equal to the first maximum transmit power, and the first expected transmit power may indicate an expected transmit power that meets a target detection requirement of the terminal device.

In a possible manner, the first indication information may further include second power control indication information, and the second power control indication information may indicate a transmit power of a second signal.

In a possible manner, the first power control indication information may further indicate a transmit power of a second signal.

In a possible manner, the first indication information may further include first time domain resource configuration information and second indication information, the first time domain resource configuration information may indicate a time domain resource of the first signal, and the second indication information may indicate that resource configuration information of the second signal is the same as the first time domain resource configuration information.

It should be noted that the transceiver module in the fourth aspect may include a receiving module and a sending module. The receiving module is configured to receive data and/or signaling from the terminal device. The sending module is configured to send data and/or signaling to the terminal device. A specific implementation of the transceiver module is not limited.

Optionally, the power control apparatus according to the fourth aspect may further include a storage module, and the storage module stores a program or instructions. When the processing module executes the program or the instructions, the power control apparatus according to the fourth aspect can perform the method according to the second aspect.

It should be noted that the power control apparatus according to the fourth aspect may be a network device, or may be a chip (system) or another component or component that may be disposed in the network device. This is not limited.

In addition, for an effect of the power control apparatus according to the fourth aspect, refer to the effect of the power control method according to any one of the possible implementations of the second aspect. Details are not described herein again.

According to a fifth aspect, a power control apparatus is provided. The power control apparatus includes a processor. The processor is configured to perform the power control method according to any one of the possible implementations of the first aspect and the second aspect.

In a possible manner, the power control apparatus according to the fifth aspect may further include a memory. The processor is coupled to the memory, and the memory is configured to store a computer program.

The processor may be configured to execute the computer program stored in the memory, so that the power control method according to any one of the possible implementations of the first aspect and the second aspect is performed.

In a possible manner, the power control apparatus according to the fifth aspect may further include a transceiver. The transceiver may be a transceiver circuit or an input/output port. The transceiver may be for the power control apparatus to communicate with another device.

It should be noted that the input port may be configured to implement the receiving functions related to the first aspect and the second aspect, and the output port may be configured to implement the sending functions related to the first aspect and the second aspect.

In the embodiments, the power control apparatus according to the fifth aspect may be a terminal device or a network device, or may be a chip or a chip system disposed in the terminal device or the network device.

In addition, for an effect of the power control apparatus according to the fifth aspect, refer to the effect of the power control method according to any one of the implementations of the first aspect and the second aspect. Details are not described herein again.

According to a sixth aspect, a communications system is provided. The communications system includes the power control apparatus according to the third aspect and the power control apparatus according to the fourth aspect.

Alternatively, the communications system includes the power control apparatus according to the third aspect for implementing the method according to the first aspect and the power control apparatus according to the fourth aspect for implementing the method according to the second aspect. For example, the communications system may include one or more terminal devices and one or more network devices.

According to a seventh aspect, a chip system is provided. The chip system includes a logic circuit and an input/output port. The logic circuit is configured to implement the processing functions related to the first aspect and the second aspect, and the input/output port is configured to implement the receiving and sending functions related to the first aspect and the second aspect. For example, the input port may be configured to implement the receiving functions related to the first aspect and the second aspect, and the output port may be configured to implement the sending functions related to the first aspect and the second aspect.

In a possible manner, the chip system further includes a memory, and the memory is configured to store program instructions and data for implementing the functions related to the first aspect and the second aspect.

The chip system may include a chip, or may include a chip and another discrete component.

According to an eighth aspect, a non-transitory computer-readable storage medium is provided, including a computer program or instructions. When the computer program or the instructions are run on a computer, the power control method according to any one of the possible implementations of the first aspect and the second aspect is performed.

According to a ninth aspect, a computer program product is provided, including a computer program or instructions. When the computer program or the instructions are run on a computer, the power control method according to any one of the possible implementations of the first aspect and the second aspect is performed.

DETAILED DESCRIPTION OF EMBODIMENTS

The following describes solutions of the embodiments with reference to accompanying drawings.

The solutions in embodiments may be applied to various communications systems, for example, a universal mobile telecommunications system ( ), a wireless local area network (WLAN), a wireless fidelity (Wi-Fi) system, a wired network, a vehicle to everything (V2X) communications system, a device-to-device (D2D) communications system, an internet of vehicles communications system, a 4th generation (4G) mobile communications system such as a long term evolution (LTE) system or a worldwide interoperability for microwave access (WiMAX) communications system, a 5th generation (5G) mobile communications system such as a new radio (NR) system, and a future communications system such as a 6th generation (6G) mobile communications system.

All aspects, embodiments, or features are presented by describing a system that may include a plurality of devices, components, modules, and the like. It should be appreciated and understood that each system may include another device, component, module, and the like, and/or may not include all devices, components, modules, and the like discussed with reference to the accompanying drawings. In addition, a combination of these solutions may be used.

In addition, in embodiments, words such as "example" or "for example" are used to indicate an example, an instance, or descriptions. Any embodiment or design scheme described as an "example" should not be explained as being more preferred or having more advantages than another embodiment or design scheme. Exactly, use of the word "example" is intended to present a concept in a specific manner.

In addition, "of", "relevant (corresponding or relevant)", and "corresponding" may be interchangeably used sometimes. It should be noted that expressed meanings are consistent when differences are not emphasized.

In embodiments, a subscript, for example, $W_1$, may sometimes be incorrectly written in a non-subscript form, for example, W1. Expressed meanings are consistent when differences are not emphasized.

A network architecture and a service scenario described in embodiments intended to describe the solutions in embodiments more clearly, and do not constitute a limitation on the solutions provided in embodiments. A person of ordinary skill in the art may understand that, with the evolution of the network architecture and the emergence of new service scenarios, the solutions provided in embodiments are also applicable to similar problems.

Figure 1:
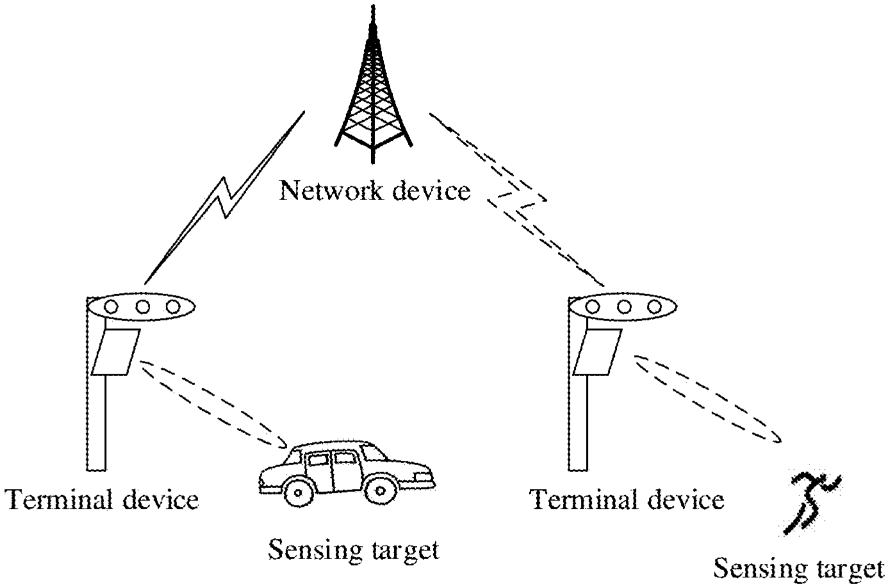
FIG. 1 is a schematic diagram of an architecture of a communications system according to an embodiment.

For ease of understanding of embodiments, a communications system shown in FIG. 1 is first used as an example to describe in detail a communications system applicable to embodiments. For example, FIG. 1 is a schematic diagram of an architecture of a communications system to which a power control method is applicable according to an embodiment.

As shown in FIG. 1, the communications system includes a terminal device and a network device. The terminal device may be a terminal device having a sensing capability, and there may be one or more terminal devices. Optionally, the communications system may further include a sensing target, and the sensing target may be referred to as a target device. Optionally, the communications system shown in FIG. 1 may further include a common terminal device, that is, a terminal device that does not have a sensing capability.

The terminal device is a terminal device that accesses the communications system and that has a wireless transceiver function, or a chip or a chip system that can be disposed in the terminal device. The terminal device may have a radar sensing function, for example, functions such as sensing signal sending and receiving and signal processing. The terminal device may also be referred to as a sensing device, user equipment (UE), a user apparatus, an access terminal, a subscriber unit, a subscriber station, a mobile console, a mobile station (MS), a remote station, a remote terminal, a mobile device, a user terminal, a terminal, a terminal unit, a terminal station, a terminal apparatus, a wireless communications device, a user agent, or a subscriber apparatus.

For example, the terminal device in this embodiment may be customer premise equipment (CPE), a mobile phone, a wireless data card, a personal digital assistant (PDA) computer, a laptop computer, a pad, a computer having a wireless transceiver function, a machine type communication (MTC) terminal, a virtual reality (VR) terminal device, an augmented reality (AR) terminal device, an internet of things (IoT) terminal device, a wireless terminal in industrial control, a wireless terminal in self driving, a wireless terminal in remote medical, a wireless terminal in a smart grid, a wireless terminal in transportation safety, a wireless terminal in a smart city, a wireless terminal in a smart home (for example, a game console, a smart television, a smart speaker, a smart refrigerator, or a fitness apparatus), a vehicle-mounted terminal, or an RSU having a terminal function. The access terminal may be a cellular phone, a cordless phone, a session initiation protocol (SIP) phone, a wireless local loop (WLL) station, a handset having a wireless communication function, a computing device, another processing device connected to a wireless modem, a wearable device, or the like. The customer premises equipment is larger in size and has a stronger function than a common terminal, and may receive a signal from a network device and then send the signal to another terminal device, which is equivalent to performing secondary relay on the signal from the network device.

For another example, the terminal device in this embodiment may be an express delivery terminal in smart logistics (for example, a device that can monitor a vehicle location of goods or a device that can monitor a temperature and humidity of goods), a wireless terminal in smart agriculture (for example, a wearable device that can collect related livestock data), a wireless terminal in smart buildings (for example, a smart elevator, a fire monitoring device, or a smart meter), a wireless terminal in smart medical (for example, a wearable device that can monitor a physiological status of a person or an animal), a wireless terminal in smart transportation (for example, a sensor such as a smart bus, a smart vehicle, a shared bicycle, a charging pile monitoring device, a smart traffic light, a train detector, or a gas station, a smart monitoring device, or a smart parking device), or a wireless terminal in smart retail (for example, a vending machine, a self-service checkout machine, or an unmanned convenience store) For another example, the terminal device may be an in-vehicle module, an in-vehicle assembly, an in-vehicle component, an in-vehicle chip, or an in-vehicle unit that is built in a vehicle as one or more parts or units. The vehicle may implement the method by using the in-vehicle module, the in-vehicle assembly, the in-vehicle component, the in-vehicle chip, or the in-vehicle unit that is built in the vehicle.

The network device is a device that is located on a network side of the communications system and has a wireless transceiver function, or a chip or a chip system that can be disposed in the device. Optionally, the network device may have a radar sensing function, for example, functions such as sensing signal sending and receiving and signal processing.

The network device includes, but is not limited to, an access point (access point, AP) in a wireless fidelity (Wi-Fi) system, such as a home gateway, a router, a server, a switch, or a network bridge, an evolved NodeB (eNB), a radio network controller (RNC), a NodeB (NB), a base station controller (base station controller, BSC), a base transceiver station (BTS), a home base station (for example, a home evolved NodeB or a home NodeB, HNB), a baseband unit (BBU), a wireless relay node, a wireless backhaul node, a transmission point (transmission and reception point, TRP), or transmission point, (TP), or the like. Alternatively, the network device may be a gNB in a 5G system such as an NR system, a transmission point (TRP or TP), or one antenna panel or a group of antenna panels (including a plurality of antenna panels) of a base station in a 5G system. Alternatively, the network device may be a network node that constitutes a gNB or a transmission point, for example, a baseband unit (BBU) or a distributed unit (DU), a road side unit (RSU) having a base station function, or the like.

The sensing target may be any object, terminal device, person, animal, or the like that can be sensed by the sensing device. For example, in a smart transportation scenario, the sensing target may be a vehicle, a pedestrian, a brick on a road, an animal, or the like.

It should be noted that the power control method provided in this embodiment is applicable to any two nodes shown in FIG. 1. For a specific implementation, refer to the following method embodiments. Details are not described herein again.

It should be noted that the solutions in embodiments may also be used in another communications system, and a corresponding name may also be a name of a corresponding function in the another communications system.

It should be understood that FIG. 1 is merely a simplified schematic diagram of an example for ease of understanding. The communications system may further include another network device and/or another terminal device that are/is not shown in FIG. 1.

To make embodiments clearer, the following uniformly describes some content and concepts related to the embodiments.

1. Time Domain Resource

The time domain resource means a quantity of orthogonal frequency division modulation (OFDM) symbols occupied in time domain. A minimum granularity of the time domain resource is one OFDM symbol, or may be a mini-slot, a slot, or the like. One mini-slot may include two or more OFDM symbols, and one slot may include 14 OFDM symbols.

2. Frequency Domain Resource

The frequency domain resource is a frequency resource occupied in frequency domain. A minimum granularity of the frequency domain resource is a resource element (RE). A granularity of the frequency domain resource may also be a resource block (RB), a resource block group (RBG), or the like. One RB includes 12 REs in frequency domain, and one RBG may include 2, 4, 8, or 16 RBs.

3. Sensing Signal

The sensing signal may also be referred to as a radar signal, is an electromagnetic wave signal, and may be used to detect a sensed object. The sensing signal may be a pulse signal, or may be a signal in a wireless communications system.

4. Echo Signal

After the sensing signal arrives at a sensing target, because the sensing target cannot completely absorb an electromagnetic wave, a signal formed after being reflected by a surface of the sensing target is an echo signal.

It should be noted that the echo signal may be a signal obtained after the sensing signal is reflected by one sensing target. For example, the echo signal may be a signal obtained after the sensing signal arrives at a sensing target 1 and then is reflected to the terminal device. Alternatively, the echo signal may be a signal obtained after the sensing signal is sequentially reflected by a plurality of sensing targets. For example, the echo signal may be a signal obtained after the sensing signal arrives at the sensing target 1, is reflected by the sensing target 1 to a sensing target 2, and then is reflected to the terminal device.

5. Time Division Multiplexing and Spatial Division Multiplexing of a Communication Signal and a Sensing Signal The following describes time division multiplexing and spatial division multiplexing of the communication signal and the sensing signal with reference to FIG. 2 to FIG. 4.

In the time division multiplexing manner, the terminal device sends the sensing signal and the communication signal on different time domain symbols, that is, the sensing signal and the communication signal occupy different time domain resources for transmission.

Figure 2:
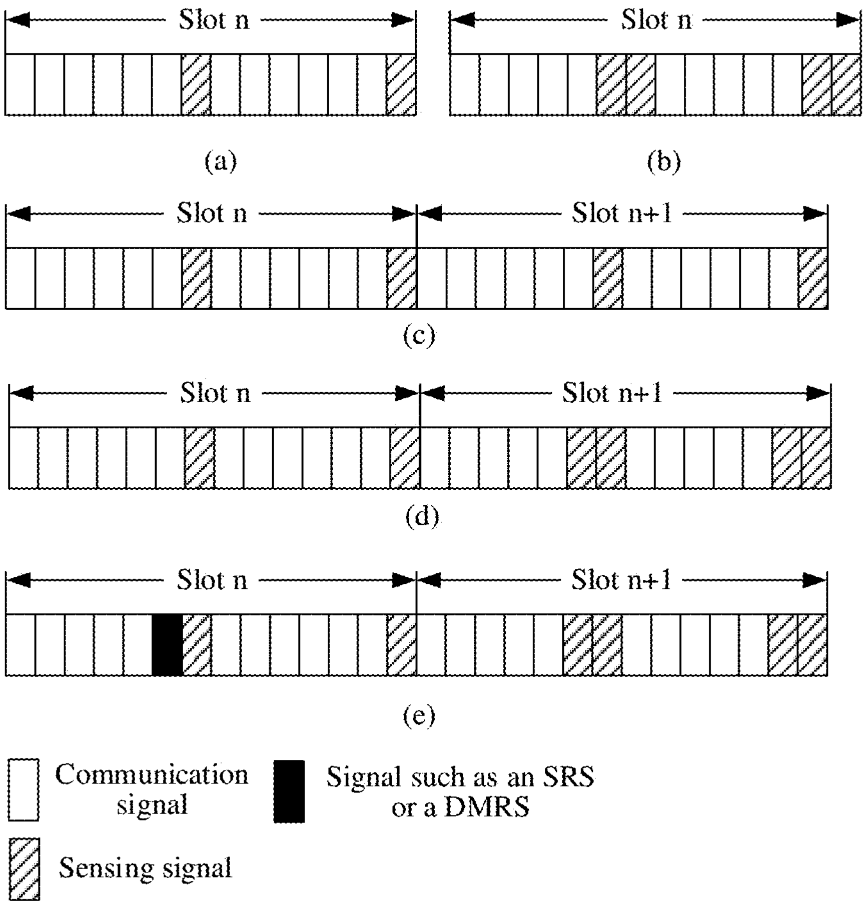
FIG. 2 is a schematic diagram of time domain resource configurations of a sensing signal and a communication signal according to an embodiment.

If the terminal device sends the sensing signal and the communication signal in the time division multiplexing manner, sensing resource overheads are relatively large. FIG. 2 is a schematic diagram of time domain resource configurations of a sensing signal and a communication signal. For one slot, as shown in (a) in FIG. 2, if every seven symbols occupy one symbol to send a sensing signal at an equal interval, sensing signal overheads are 14.3%; and as shown in (b) in FIG. 2, if every seven symbols occupy two symbols to send a sensing signal, sensing signal overheads are 28.6%.

It should be noted that resource configurations of the sensing signal in all slots may be the same. As shown in (c) in FIG. 2, the resource configuration shown in (a) in FIG. 2 is used in each slot. Alternatively, resource configurations of the sensing signal in all slots may be different, or resource configurations of the sensing signal in some slots may be different. As shown in (d) in FIG. 2, the resource configuration shown in (a) in FIG. 2 is used in some slots, and the resource configuration shown in (b) in FIG. 2 is used in the other slots.

Optionally, a signal such as a sounding reference signal (SRS) or a demodulation reference signal (DMRS) may occupy a time domain resource. As shown in (e) in FIG. 2, resource configurations of the sensing signal in a slot n and a slot n+1 are different, and a signal such as an SRS or a DMRS occupies one symbol in the slot n, and does not occupy a symbol in the slot n+1. In this way, the sensing signal occupies different slot locations in different slots, so that a collision between the sensing signal and the signal such as the SRS or the DMRS can be avoided.

Figure 3:
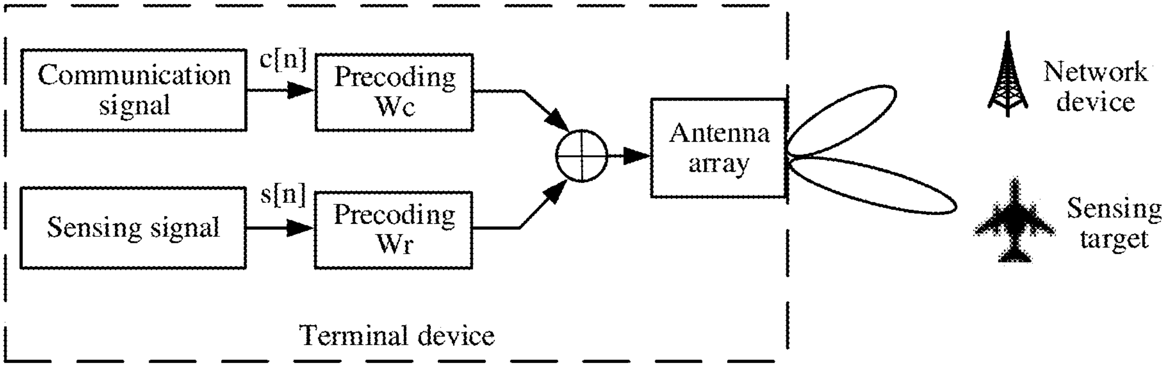
FIG. 3 is a schematic diagram of layered transmission of a sensing signal and a communication signal according to an embodiment.

In the spatial division multiplexing manner, the terminal device may perform layered transmission on the communication signal and the sensing signal. For example, the communication signal and the sensing signal occupy a same time domain resource for layered transmission through different precoding (precoding) by using different beams. With reference to FIG. 3, c[n] is a communication signal, s[n] is a sensing signal, We is a precoding matrix used to transmit the communication signal, and Wr is a precoding matrix used to transmit the sensing signal. The communication signal and the sensing signal are separately precoded and then superposed together, and are sent by sharing a transmit end antenna array.

Figure 4:
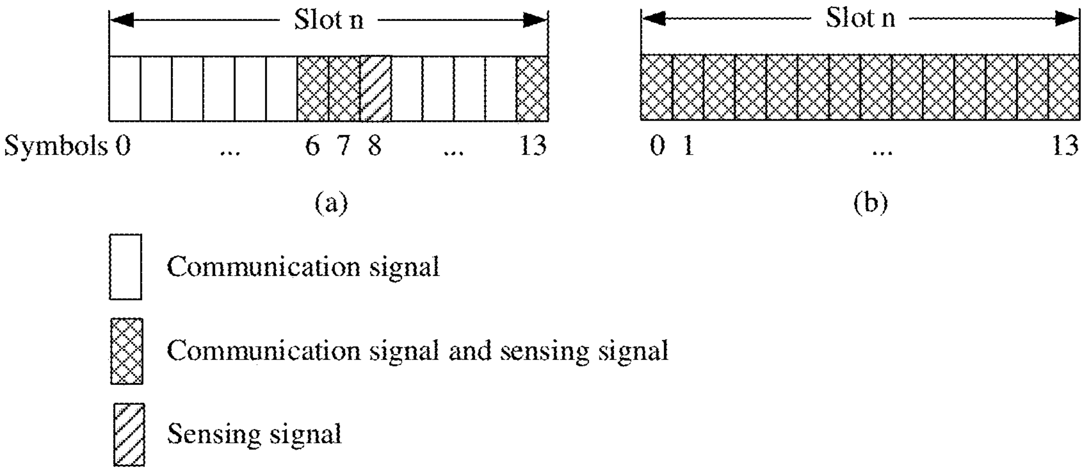
FIG. 4 is another schematic diagram of time domain resource configurations of a sensing signal and a communication signal according to an embodiment.

As shown in FIG. 4, a communication signal and a sensing signal may be sent on a same time domain resource, and layered transmission of the communication signal and the sensing signal may be performed on the same resource. As shown in (a) in FIG. 4, time domain resource configurations of the communication signal and the sensing signal may partially overlap. As shown in (b) in FIG. 4, time domain resource configurations of the communication signal and the sensing signal may completely overlap.

The communication signal may be used to transmit data between a terminal device and a network device, and the sensing signal may be for the terminal device to detect a sensing target, to obtain information such as a speed, a distance, a moving track, a shape and a size, a type, and a location of the sensing target. Layered transmission of a sensing signal and a communication signal can reduce sensing overheads, obtain a spatial division multiplexing gain, and improve spectrum utilization to some extent.

A radar is widely used in scenarios such as air detection, ground traffic monitoring, weather detection, security monitoring, and electromagnetic imaging. For example, during ground traffic monitoring, the radar may be used for vehicle speed measurement, emergency lane occupation monitoring, lane change violation monitoring, and the like. During air detection, the radar may be used for unmanned aerial vehicle monitoring and the like. By sending a sensing signal and receiving an echo signal for the sensing signal, a terminal device having a sensing function may sense a target device, and estimate sensing information. However, in the conventional technology, no specific solution of power control for a sensing signal is proposed, and sensing performance of a terminal device cannot be ensured.

For the communication signal, uplink power control is implemented on an SRS and three physical channels: a physical uplink shared channel (PUSCH), a physical uplink control channel (PUCCH), and a physical random access channel (PRACH). However, a performance requirement of a sensing system is different from that of a communications system, and a path loss of a sensing link is different from that of a communication link. Therefore, an uplink power control solution is applicable to the communication signal, and is not applicable to the sensing signal. For example, a path loss of uplink power control is a downlink path loss estimated by the terminal device. Different from a path loss of the communication signal, a path loss of the sensing signal includes a path loss from the terminal device to at least one sensing target and a path loss of an echo signal from the at least one sensing target to the terminal device. When the echo signal is a signal obtained after the sensing signal is sequentially reflected by a plurality of sensing targets, the path loss of the sensing signal may further include a loss of a path between the plurality of sensing targets, that is, a sensing path represents a round-trip link between the terminal device and at least one object.

For sensing, a target detection probability is an important factor to measure performance of the sensing system. The target detection probability is highly sensitive to a change of a signal-to-noise ratio (SNR). If a transmit power of the sensing signal is low or interference in an environment is severe, precision of sensing target detection may be affected to some extent. Therefore, properly setting the transmit power of the sensing signal can effectively improve the target detection probability, thereby improving sensing precision and ensuring sensing performance.

In addition, as detection requirements increase, if the radar is used independently to perform detection with relatively wide coverage, costs of the radar device are relatively high. In addition, in a case of continuous coverage, interference between radars is large, and consequently the detection requirement cannot be met. A wireless communications system such as a cellular network of 4G LTE/5G NR can have advantages such as, but not limited to, large deployment scale and wide coverage in addition to abundant spectrum resources. It is an important trend to integrate advantages of radar detection and wireless network communication.

In a communication and sensing integration scenario, the communication signal and the sensing signal may be transmitted in the spatial division multiplexing manner. In consideration of different requirements of the sensing system and the communications system, the sensing signal and the communication signal may require different transmit powers. However, in some embodiments, when the terminal device performs multi-layer transmission, transmit powers of all layers are the same, that is, the transmit powers of the sensing signal and the communication signal cannot be adjusted based on different sensing and communication requirements. In other words, in the communication and sensing integration scenario, the transmit powers of the sensing signal and the communication signal cannot be properly allocated, communication and sensing performance cannot be ensured, and normal communication and sensing cannot be performed. Consequently, reliability of a communication and sensing integration system is low. It should be noted that, in the embodiments, a scenario of layered transmission of a sensing signal and a communication signal indicates that the sensing signal and the communication signal occupy a same time domain resource for transmission.

Therefore, there is a lack of a power control method for the sensing signal. In addition, in the scenario of layered transmission of the sensing signal and the communication signal, there is a lack of a power control method for the communication signal and the sensing signal.

According to a power control method and apparatus provided in the embodiments, a transmit power of a first signal is determined based on a path loss of a detection link, and the first signal is sent by using the determined transmit power, so that sensing performance of a terminal device can be ensured, and sensing precision can be improved. In addition, for the communication and sensing integration system, according to the power control method and apparatus provided in the embodiments, the terminal device may perform target detection at a proper transmit power whose evaluation indicator meets a sensing system requirement. The evaluation indicator in the embodiments may be a signal-to-noise ratio, a target detection probability, target resolution, target distance/speed estimation precision, or the like. Further, on the basis of ensuring sensing performance of the terminal device, a throughput of a communications system may be maximized and power consumption of the terminal device may be minimized, thereby improving performance of the communication and sensing integration system.

Figure 5:
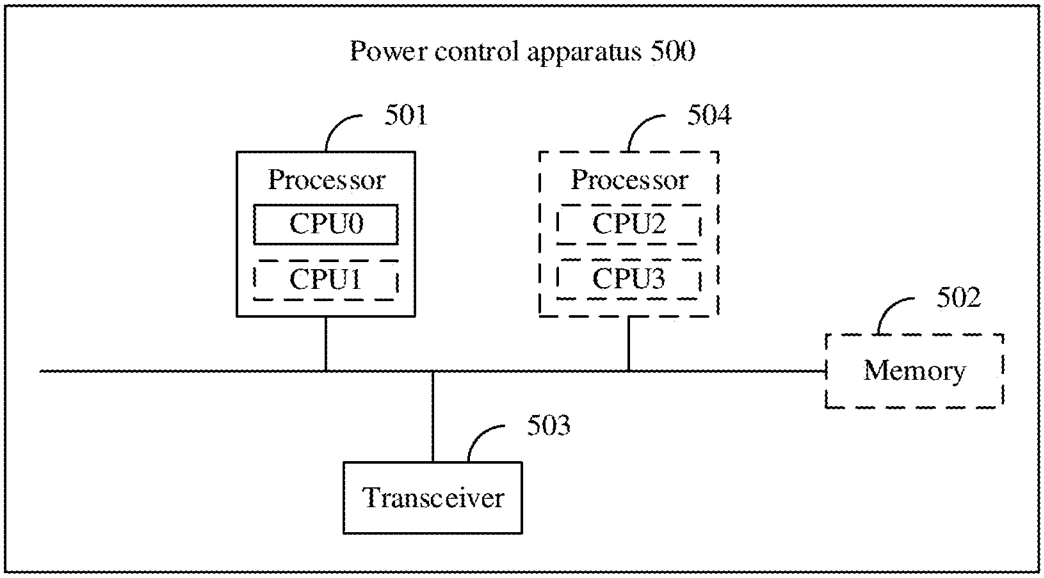
FIG. 5 is a schematic diagram of a structure of a power control apparatus according to an embodiment.
Figure 6:
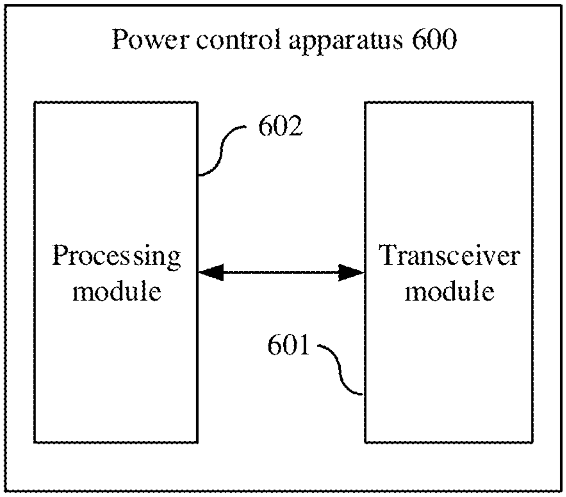
FIG. 6 is a schematic diagram of a structure of another power control apparatus according to an embodiment.

The following describes power control apparatuses provided in embodiments with reference to FIG. 5 and FIG. 6.

FIG. 5 is a schematic diagram of a structure of a power control apparatus according to an embodiment.

The power control apparatus 500 may be a terminal device or a network device, or may be a chip used in the terminal device or the network device, or may be another component having a corresponding function. As shown in FIG. 5, the power control apparatus 500 may include a processor 501. Optionally, the power control apparatus 500 may further include one or more of a memory 502 and a transceiver 503. The processor 501 and the one or more of the memory 502 and the transceiver 503 may be coupled, for example, may be connected by using a communications bus, or the processor 501 may be used independently.

The following describes each component of the power control apparatus 500 in detail with reference to FIG. 5.

The processor 501 is a control center of the power control apparatus 500, and may be one processor, or may be a general term of a plurality of processing elements. For example, the processor 501 is one or more central processing units (CPU), or may be an application-specific integrated circuit (ASIC), or may be one or more integrated circuits configured to implement embodiments, for example, one or more digital signal processors (DSP) or one or more field programmable gate arrays (FPGA).

The memory 502 is configured to store a computer program, and may further store data.

The processor 501 may perform various functions of the power control apparatus 500 by executing the computer program stored in the memory 502 and invoking the data stored in the memory 502.

During specific implementation, in an embodiment, the processor 501 may include one or more CPUs, for example, CPU0 and CPU1 shown in FIG. 5.

During specific implementation, in an embodiment, the power control apparatus 500 may alternatively include a plurality of processors, for example, a processor 501 and a processor 504 shown in FIG. 5. Each of the processors may be a single-core processor (single-CPU), or may be a multi-core processor (multi-CPU). The processor herein may be one or more communications devices, circuits, and/or processing cores configured to process data (for example, computer program instructions).

Optionally, the memory 502 may be a read-only memory (ROM) or another type of static storage communications device that can store static information and instructions, or a random access memory (RAM) or another type of dynamic storage communications device that can store information and instructions, or may be an electrically erasable programmable read-only memory (EEPROM), a compact disc read-only memory (compact disc ROM, CD-ROM) or another compact disc storage, an optical disc storage (including a compressed optical disc, a laser disc, an optical disc, a digital versatile disc, a Blu-ray disc, or the like), a magnetic disk storage medium or another magnetic storage communications device, or any other medium that can be used to carry or store expected program code in a form of an instruction or a data structure and that can be accessed by a computer. However, this is not limited thereto. The memory 502 may be integrated with the processor 501, or may exist independently, and is coupled to the processor 501 by using an input/output port (not shown in FIG. 5) of the power control apparatus 500. This is not limited in this embodiment.

For example, the input port may be configured to implement a receiving function performed by the terminal device or the network device in any one of the following method embodiments, and the output port may be configured to implement a sending function performed by the terminal device or the network device in any one of the following method embodiments.

The memory 502 may be configured to store a computer program (or code) for executing the solutions of the embodiments, and the processor 501 controls the execution. For a specific implementation, refer to the following method embodiments. Details are not described herein.

Optionally, the transceiver 503 is configured to communicate with another power control apparatus. For example, when the power control apparatus 500 is a terminal device, the transceiver 503 may be configured to communicate with a network device. For another example, when the power control apparatus 500 is a network device, the transceiver 503 may be configured to communicate with a terminal device. In addition, the transceiver 503 may include a receiver and a transmitter (not separately shown in FIG. 5). The receiver is configured to implement a receiving function, and the transmitter is configured to implement a sending function. The transceiver 503 may be integrated with the processor 501, or may exist independently, and is coupled to the processor 501 by using an input/output port (not shown in FIG. 5) of the power control apparatus 500. This is not limited in this embodiment.

It should be noted that the structure of the power control apparatus 500 shown in FIG. 5 does not constitute a limitation on the power control apparatus. An actual power control apparatus may include more or fewer components than those shown in the figure, or may combine some components, or may have different component arrangements.

The actions of the terminal device in the following method embodiments may be performed by the processor 501 in the power control apparatus 500 shown in FIG. 5 by invoking the computer program stored in the memory 502 to indicate the terminal device to perform the actions.

The actions of the network device in the following method embodiments may be performed by the processor 501 in the power control apparatus 500 shown in FIG. 5 by invoking the computer program stored in the memory 502 to indicate the network device to perform the actions. This is not limited in embodiments.

It should be noted that all related content of the steps in the following method embodiments may be cited in function descriptions of corresponding functional modules. Details are not described herein again.

FIG. 6 is a schematic diagram of a structure of another power control apparatus according to an embodiment. For ease of description, FIG. 6 shows only main components of the power control apparatus.

The power control apparatus 600 includes a transceiver module 601 and a processing module 602. The power control apparatus 600 may be the terminal device or the network device in the following method embodiments. The transceiver module 601 may also be referred to as a transceiver unit, and is configured to implement receiving and sending functions performed by the terminal device or the network device in any one of the following method embodiments.

It should be noted that the transceiver module 601 may include a receiving module and a sending module (not shown in FIG. 6). The receiving module is configured to receive data and/or signaling from another device. The sending module is configured to send data and/or signaling to the another device. A specific implementation of the transceiver module is not limited. The transceiver module may include a transceiver circuit, a transceiver machine, a transceiver, or a communications interface.

The processing module 602 may be configured to implement a processing function performed by the terminal device or the network device in any one of the following method embodiments. The processing module 602 may be a processor.

In this embodiment, the power control apparatus 600 is presented in a form of obtaining each functional module through division in an integrated manner. Herein, "module" may be a specific ASIC, a circuit, a processor that executes one or more software or firmware programs, a memory, an integrated logic circuit, and/or another component capable of providing the foregoing functions. In a simple embodiment, a person skilled in the art may figure out that the power control apparatus 600 may be in a form of the power control apparatus 500 shown in FIG. 5.

For example, the processor 501 in the power control apparatus 500 shown in FIG. 5 may invoke computer-executable instructions stored in the memory 502, so that the power control method in the following method embodiment is performed.

For example, functions/implementation processes of the transceiver module 601 and the processing module 602 in FIG. 6 may be implemented by the processor 501 in the power control apparatus 500 shown in FIG. 5 by invoking the computer-executable instructions stored in the memory 502. Alternatively, a function/implementation process of the processing module 602 in FIG. 6 may be implemented by the processor 501 in the power control apparatus 500 shown in FIG. 5 by invoking the computer-executable instructions stored in the memory 502, and a function/implementation process of the transceiver module 601 in FIG. 6 may be implemented by the transceiver 503 in the power control apparatus 500 shown in FIG. 5.

Because the power control apparatus 600 provided in this embodiment may perform the following power control method, for an effect that can be achieved by the power control apparatus 600, refer to the following method embodiment. Details are not described herein again.

It should be noted that one or more of the foregoing modules may be implemented by using software, hardware, or a combination thereof. When any one of the foregoing modules is implemented by using software, the software exists in a form of computer program instructions, and is stored in a memory, and a processor may be configured to execute the program instructions to implement the following method procedure. The processor may be built in an SoC (system-on-a-chip) or an ASIC, or may be an independent semiconductor chip. The processor may further include a necessary hardware accelerator, for example, a field programmable gate array, a programmable logic device (PLD), or a logic circuit that implements a dedicated logic operation, outside a core that is configured to execute software instructions to perform an operation or processing.

When the foregoing modules are implemented by using hardware, the hardware may be any one or any combination of a CPU, a microprocessor, a DSP chip, a microcontroller unit (MCU), an artificial intelligence processor, an ASIC, an SoC, an FPGA, a PLD, a dedicated digital circuit, a hardware accelerator, or a non-integrated discrete device. The hardware may run necessary software or do not depend on software to perform the following method procedure.

Figure 7:
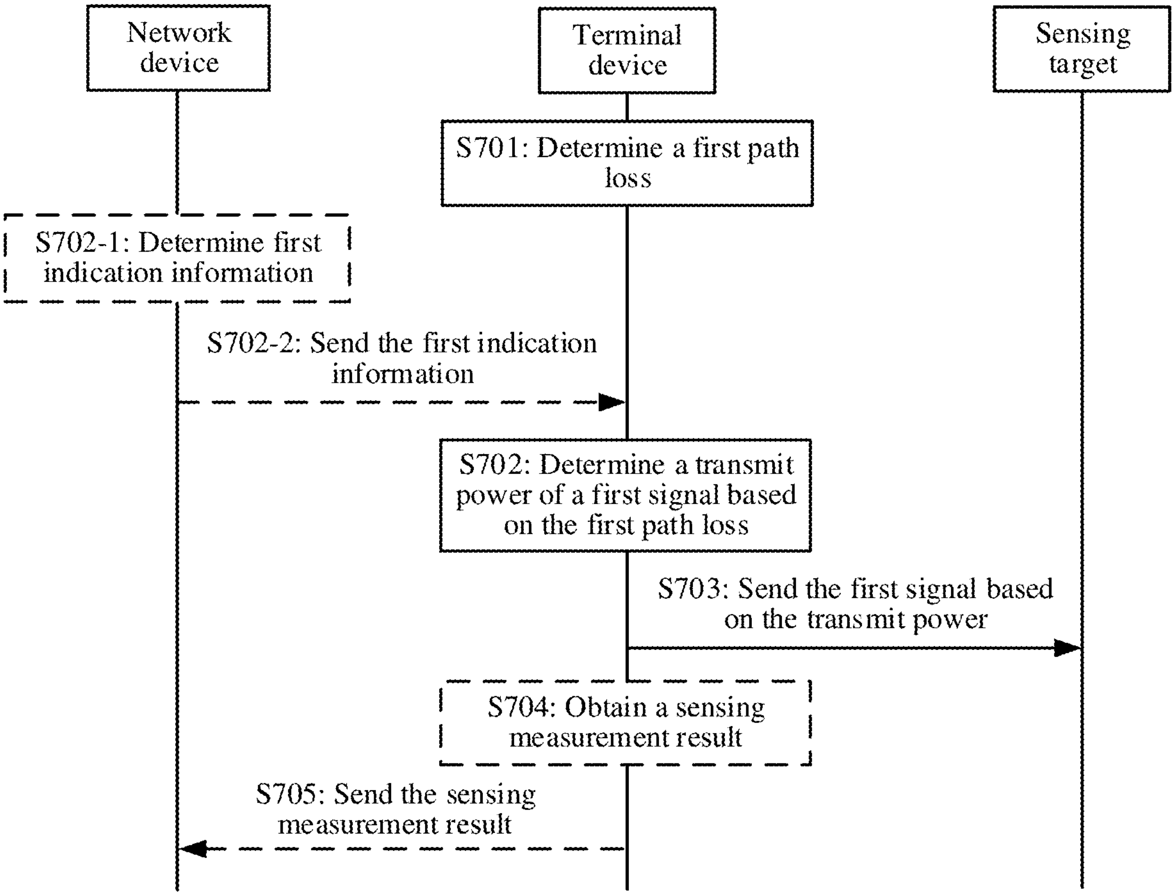
FIG. 7 is a schematic flowchart of a power control method according to an embodiment.
Figure 8:
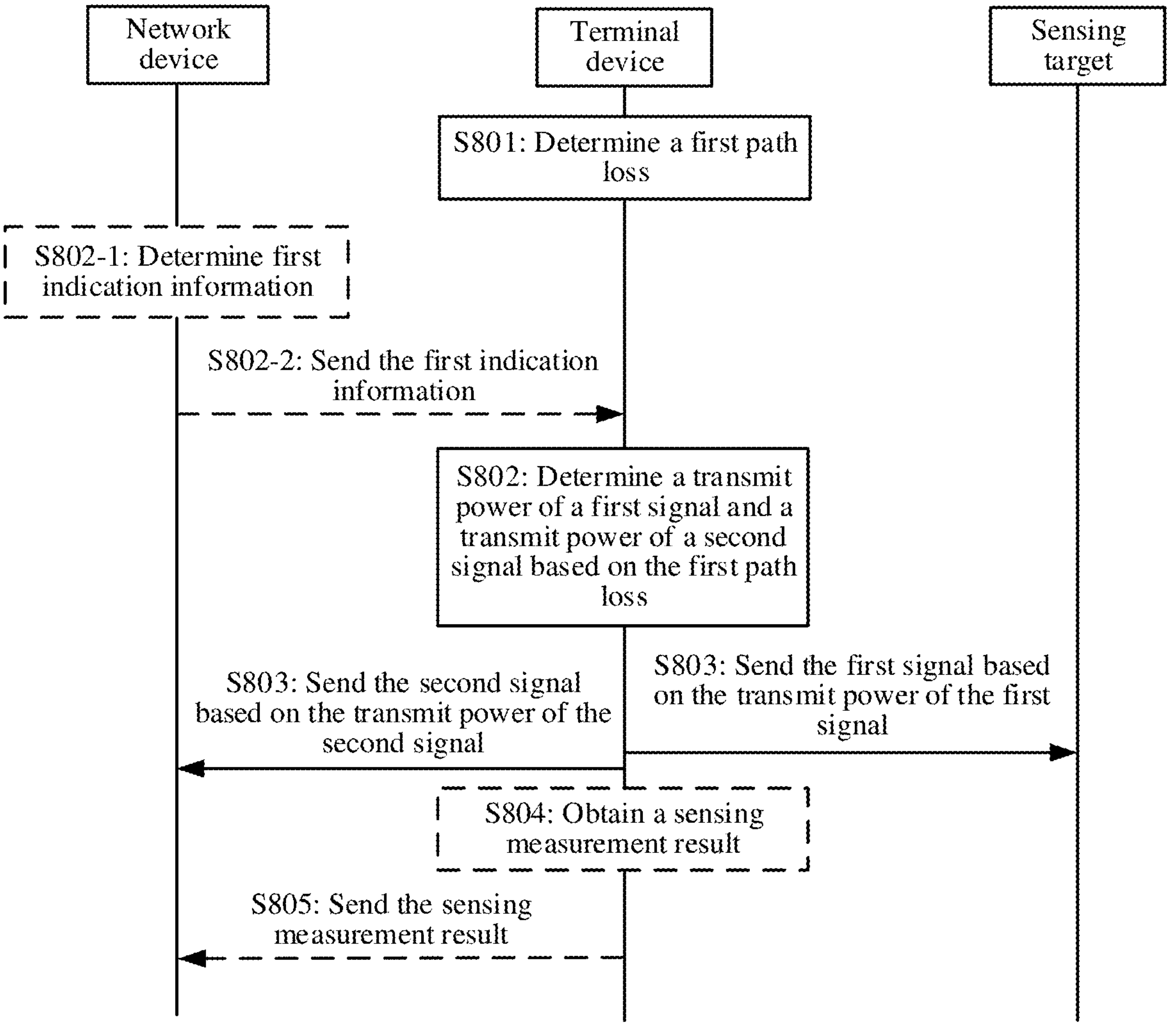
FIG. 8 is a schematic flowchart of another power control method according to an embodiment.

The following describes power control methods provided in embodiments with reference to FIG. 7 and FIG. 8.

For example, FIG. 7 is a schematic flowchart of a power control method according to an embodiment. The power control method is applicable to communication between the network device and the terminal device and communication between the terminal device and the sensing device shown in FIG. 1. The method shown in FIG. 7 describes a power control method for a first signal.

As shown in FIG. 7, the power control method includes the following steps.

S701: A terminal device determines a first path loss.

That a terminal device determines a first path loss may alternatively be that the terminal device obtains the first path loss.

In a possible manner, the first path loss is a path loss of a detection link, and the detection link is a round-trip link between the terminal device and at least one object. The object may also be referred to as a sensing target.

In a process in which the terminal device performs target detection, after the terminal device sends a signal, the signal may pass through one sensing target and then be reflected to the terminal device, or the signal may sequentially pass through a plurality of sensing targets and then be reflected to the terminal device.

For example, a link on which the terminal device performs target detection may be from the terminal device to the sensing target to the terminal device, for example, from the terminal device to a sensing target 1 to the terminal device; or may be from the terminal device to the plurality of sensing targets to the terminal device, for example, from the terminal device to the sensing target 1 to a sensing target 2 to the terminal device. A quantity of sensing targets is not limited.

For example, with reference to FIG. 1, the first path loss may be a path loss of sending a sensing signal by the terminal device (for example, a transmit power for sending the sensing signal is $P_t$) and receiving a reflected echo signal (for example, a receive power of the received echo signal for the sensing signal is $P_r$), and the first path loss may be represented as $P_t-P_r$. For example, the first path loss may include a loss of a path from the terminal device to the sensing target and a loss of a path from the sensing target to the terminal device. When the echo signal is a signal obtained after the sensing signal is reflected by the plurality of sensing targets, the first path loss may further include a loss of a path between the plurality of sensing targets.

In a possible manner, the first path loss is determined by the terminal device based on first information, a signal from the terminal device, and/or a signal from a device other than the terminal device.

Optionally, the first information may include one or more of the following: reference path loss information, distance information, or a first path loss correction value.

For example, the first information may be from a network device or another terminal device. For example, the network device or the another terminal device sends the first information to the terminal device. Correspondingly, the terminal device receives the first information from the network device or the another terminal device.

For example, the first information may be carried in one or more of radio resource control (RRC) signaling, media access control control element (MAC CE) signaling, and downlink control information (DCI) signaling. One or more fields occupied by the one or more items included in the first information may be a field defined in the RRC signaling, a field defined in the MAC CE signaling, or a field defined in the DCI signaling, or may be a field newly defined in at least one piece of the foregoing signaling.

It should be noted that the first information may alternatively be carried in newly defined signaling. This is not limited in this embodiment.

Optionally, the first information may indicate the first path loss.

For example, the reference path loss information may indicate a configured path loss.

In some embodiments, the first path loss may be determined by the terminal device based on the reference path loss information.

For example, the terminal device may determine that the first path loss is a value indicated by the reference path loss information. This is applicable to a scenario in which the terminal device performs sensing detection for the first time, and the configured reference path loss information is directly used as an initial value. The reference path loss information may be determined based on a requirement for a farthest detection distance of the terminal device.

Optionally, the network device may configure one or more pieces of reference path loss information (for example, by using the RRC signaling) for the terminal device, and indicate, based on a sensing scenario and a sensing precision requirement, the terminal device to use one piece of the reference path loss information (for example, DCI).

For example, the distance information may indicate a distance that the terminal device supports detection, or a distance between the terminal device and the sensing target.

In some embodiments, the first path loss may be determined by the terminal device based on the distance information. This is applicable to a scenario in which the terminal device performs sensing detection for the first time or a scenario of sensing detection in a tracking mode. During the sensing detection in a tracking mode, the terminal device may perform detection based on a specific sensing target, that is, before the sensing detection, the terminal device may obtain some prior information of the sensing target, for example, initial distance and speed information.

Optionally, the first path loss may be determined by the terminal device by using the distance information, a space signal attenuation model, and a radar cross-section (RCS) of the sensing target. For example, step a to step c may be included.

Step a: The terminal device determines a path loss $PL_{forward}$ of a forward link based on the distance information and the space signal attenuation model.

It may be understood that a round-trip link on which the terminal device performs target detection may be classified into a forward link and a backward link. The forward link represents a path from the terminal device to at least one sensing target, and the backward link represents a path from the at least one sensing target to the terminal device.

For example, the space signal attenuation model may be used to describe attenuation of a propagation signal in a propagation distance, that is, may be represented as a function related to the signal propagation distance. The space signal attenuation model may be indicated by the network device or the another terminal device to the terminal device based on a specific detection scenario by using the first information, or may be used by the terminal device by default in a current scenario.

For example, the space signal attenuation model may be represented as $PL=A+B\times\log_{10}(d_{3D})+C\times\log_{10}(f_c)$, and a unit is decibel (decibel, dB). A, B, and C are parameter values configured depending on an actual propagation scenario (for example, a rural macro (rural macro, RMa) scenario, an urban macro (Urban Macro, UMa) scenario, an urban micro (Urban Micro, UMi) scenario, and an indoor (indoor, InH) scenario) and a path type (for example, a line-of-sight (line-of-sight, LoS) path and a non-line-of-sight (non-line-of-sight, NLoS) path); $d_{3D}$ indicates the distance information; and $f_C$ is a carrier frequency.

It should be noted that a distance in the space signal attenuation model represents distance information of the forward or backward link, rather than a total distance of the round-trip link. The space signal attenuation model may be a path loss model applicable to different scenarios, or may be a model specially applicable to a sensing scenario. This is not limited.

Step b: Determine a path loss $PL_{backward}$ of the backward link.

Considering that a delay between the forward link and the backward link of a sensing system is relatively small, the path loss of the forward link and the path loss of the backward link may be approximately equal. For example, the path loss $PL_{backward}$ of the backward link is equal to the path loss $PL_{forward}$ of the forward link.

It should be noted that, in step a, the path loss $PL_{backward}$ of the backward link may be determined based on the distance information and the space signal attenuation model, and in step b, the path loss $PL_{forward}$ of the forward link is determined based on the path loss $PL_{backward}$ of the backward link.

Step c: Determine the first path loss based on Formula (1).

Based on a transmit power relationship between receive and transmit signals in a radar equation, a total path loss (that is, the first path loss) of the round-trip link may be approximately represented as Formula (1), or may meet a constraint of Formula (1).

$$PL_{total} = PL_{forward} \times PL_{backward} \times \text{sensing target } RCS \times \frac{4\pi}{\lambda^2} \quad (1)$$

In Formula (1), the parameters $PL_{forward}$ and $PL_{backward}$ respectively represent path loss values of the forward link and the backward link that are obtained through calculation; and $PL_{total}$ and $PL_{forward}$ and $PL_{backward}$ all are linear values. A target RCS sensing unit is square meters ($m^2$), and may be indicated by using the first information, or may be used by the terminal device by default in a current scenario; A represents a wavelength in a unit of meters (m); and π is an infinite non-cyclic decimal.

For example, the first path loss correction value may be used to adjust a path loss.

Optionally, there may be one or more first path loss correction values, and different first path loss correction values may be selected based on different application scenarios.

In some embodiments, the first path loss may be determined by the terminal device based on the first path loss correction value.

Vehicle detection in a highway scenario is used as an example. It may be approximately considered that a vehicle moves at a constant and high speed. Further, path loss values corresponding to two adjacent sensing signal transmission opportunities may be greatly different, and a path loss correction value may further improve sensing performance.

When the terminal device performs sensing detection for the first time, the first path loss correction value may be an adjustment value of a path loss determined by the terminal device based on a supported farthest detection distance. In this way, the terminal device may determine a first path loss at a current transmission opportunity based on the first path loss correction value and the path loss that is determined by the terminal device based on the supported farthest detection distance. For example, in this case, first path loss=path loss value obtained based on the farthest detection distance supported by the terminal device+first path loss correction value.

For example, the first path loss correction value may represent an adjustment value of a path loss value determined by the terminal device at a previous sensing signal transmission opportunity. In this way, the terminal device may determine a first path loss at a current transmission opportunity based on the first path loss correction value and the path loss determined by the terminal device at the previous sensing signal transmission opportunity. For example, in this case, first path loss=path loss value obtained at the previous sensing signal transmission opportunity+first path loss correction value.

In some embodiments, the first path loss may be determined by the terminal device based on the reference path loss information and the first path loss correction value.

For example, first path loss=reference path loss information+first path loss correction value.

The reference path loss information may be considered as coarse estimation of a detection link path loss, and the first path loss correction value may be considered as further refined estimation based on the reference path loss information. In this way, a path loss of the sensing signal at a current transmission opportunity may be determined based on the reference path loss information and the first path loss correction value.

In some embodiments, the first path loss may be determined by the terminal device based on the first path loss correction value and the path loss value $PL_{forward}$ of the forward link; or the first path loss may be determined based on the first path loss correction value and the path loss value $PL_{backward}$ of the backward link. For example, step d and step e may be included.

Step d: The terminal device determines the path loss value $PL_{backward}$ of the backward link based on the first path loss correction value and the path loss value $PL_{forward}$ of the forward link.

Optionally, the first path loss correction value $\Delta_{PL}$ may indicate a deviation between the path loss value $PL_{forward}$ of the forward link and the path loss value $PL_{backward}$ of the backward link.

In consideration of a change of a propagation environment and/or a movement of a sensing target, the path loss value of the forward link may be different from that of the backward link, and the terminal device may adjust the path loss value of the backward link based on the determined path loss of the forward link and the first path loss correction value (step d and step e are described by using this as an example); or the terminal device may adjust the path loss value of the forward link based on the determined path loss of the backward link and the first path loss correction value (an implementation is similar to step d and step e, and details are not described herein again), to properly estimate path loss information corresponding to the round-trip link on which the terminal device performs target detection.

The path loss of the forward/backward link may be determined by using the distance information mentioned above (for example, step a), or may be determined by using a signal from a device other than the terminal device (refer to the following descriptions). This is not limited.

Step e: Determine the first path loss based on Formula (1).

For a specific implementation of step e, refer to step c. Details are not described herein again. A main difference between step d and step e and step a to step c lies in that, in the method shown in step d and step e, there may be a deviation between the path loss value $PL_{forward}$ of the forward link and the path loss value $PL_{backward}$ of the backward link, and the deviation is the first path loss correction value $\Delta_{PL}$; and in step a to step c, the path loss value $PL_{forward}$ of the forward link is approximately equal to the path loss value $PL_{backward}$ of the backward link.

In some embodiments, the first path loss may be determined based on a signal from a device other than the terminal device.

Optionally, if the sensing target is a device having a communication capability, the terminal device may determine the first path loss based on a reference signal received power (RSRP) from the sensing target. The RSRP is a value that is from the sensing target, that represents received signal strength, and that is measured by the terminal device. A value of the RSRP varies with a distance from the sensing target to the terminal device, and may reflect a signal attenuation degree of a corresponding path from the sensing target to the terminal device. For example, step f to step h may be included.

Step f: The terminal device may determine the path loss value $PL_{backward}$ of the backward link by measuring a sounding reference signal-reference signal received power (SRS-RSRP) from the sensing target and a reference signal power configured by using higher layer signaling.

For example, the path loss, such as $PL_{backward}$, corresponding to the backward link (that is, the path from the sensing target to the terminal device) is obtained through calculation based on the following: path loss estimation formula PL=reference signal power configured by using the higher layer signaling−measured SRS-RSRP.

Further, a path loss value of the round-trip link may be estimated according to the solution described above.

Step g: The terminal device determines that the path loss value $PL_{forward}$ of the forward link is equal to the path loss $PL_{backward}$ of the backward link (similar to step b, where for a specific implementation, refer to step b). Alternatively, the terminal device determines the path loss value $PL_{forward}$ of the forward link based on the first path loss correction value and the path loss value $PL_{backward}$ of the backward link (similar to step d, where for a specific implementation, refer to step d).

Step h: Determine the first path loss based on Formula (1).

For a specific implementation of step h, refer to step c. Details are not described herein again.

In some embodiments, the first path loss may be determined by the terminal device by using a signal from the terminal device. This may be understood as that the terminal device may determine the first path loss based on a result of performing sensing measurement by sending a sensing signal and receiving an echo signal for one or more times before a current transmission opportunity.

Optionally, the sensing signal may be from the terminal device at one or more transmission opportunities before the current transmission opportunity. The one or more transmission opportunities are one or more transmission opportunities of the sensing signal.

For example, before the current transmission opportunity, the terminal device may send the sensing signal and receive the echo signal at the one or more transmission opportunities, and obtain the sensing measurement result.

Optionally, the sensing measurement result may include one or more of the following: a path loss, a receive power of the echo signal, a speed-distance spectrum obtained after radar processing, and the like. This is not limited.

For example, the terminal device may estimate the path loss of the round-trip link for target detection at the current transmission opportunity by measuring the receive power of the echo signal. Because the terminal device learns of the transmit power of the sensing signal at the current transmission opportunity, based on a path loss calculation formula, the total path loss of the round-trip link may be represented as follows: $PL_{total}$=transmit power of the sensing signal−receive power of the sensing signal, to obtain the first path loss.

Optionally, an example in which the terminal device sends a sensing signal and receives an echo signal at a transmission opportunity and the sensing measurement result is a path loss is used. That the first path loss is determined by the terminal device by using a signal from the terminal device may include: the first signal is transmitted at a transmission opportunity $T_0$, and the first path loss is determined based on a path loss obtained at one or more transmission opportunities before the transmission opportunity $T_0$.

Optionally, the first signal may be a sensing signal.

For example, the first signal may be a physical channel, for example, a PUSCH, a PUCCH, or a PRACH. The first signal may alternatively be a reference signal, for example, an SRS, a DMRS, a phase track reference signal (PTRS), or a signal independently used for detection.

For example, one transmission opportunity before the transmission opportunity $T_0$ may be a previous transmission opportunity, or may be any transmission opportunity before the transmission opportunity $T_0$. This is not limited.

For example, the previous transmission opportunity $T_{0-1}$ is used as an example. The first path loss may be determined based on a path loss of a link on which the terminal device performs target detection at the previous transmission opportunity $T_{0-1}$.

For example, a manner of determining the first path loss may include cumulative calculation and absolute calculation. Optionally, a specific determining manner used by the terminal device may be indicated by the network device, for example, indicated by using the RRC signaling.

For the cumulative calculation, the first path loss at the current transmission opportunity may meet: $PL_{sensing}(T_0)=PL_{sensing}(T_{0-1})+\delta_{sensingPL}$. $PL_{sensing}(T_{0-1})$ is the path loss of target detection performed by the terminal device at the previous transmission opportunity $T_{0-1}$, and $\delta_{sensingPL}$ is the first path loss correction value. For example, the first path loss correction value may represent an adjustment value of the path loss value determined by the terminal device at the previous sensing signal transmission opportunity.

For the absolute calculation, the first path loss at the current transmission opportunity may meet: $PL_{sensing}(T_0)=PL_{sensing}(T_{0-1})$.

In other words, the first path loss may be determined based on the path loss of target detection performed by the terminal device at the previous transmission opportunity $T_{0-1}$ and the first path loss correction value, or the first path loss may be equal to the path loss of target detection performed by the terminal device at the previous transmission opportunity $T_{0-1}$.

For example, the plurality of transmission opportunities before the transmission opportunity $T_0$ may be a plurality of latest transmission opportunities, or may be any plurality of transmission opportunities before the transmission opportunity $T_0$. This is not limited.

For example, the plurality of latest transmission opportunities $T_{0-x}$ to $T_{0-1}$ are used as an example, where X is an integer greater than 1. The first path loss may be determined based on path losses obtained based on the transmission opportunities $T_{0-x}$ to $T_{0-1}$.

For the cumulative calculation, the first path loss at the current transmission opportunity may meet: $PL_{sensing}(T_0)=PL_{sensing}(T_{0-x\ to\ 0-1})+\delta_{sensingPL}$. For the absolute calculation, the first path loss at the current transmission opportunity may meet: $PL_{sensing}(T_0)=PL_{sensing}(T_{0-x\ to\ 0-1})$.

$\delta_{sensingPL}$ is the first path loss correction value, and $PL_{sensing}(T_{0-x\ to\ 0-1})$ may be an average value or a weighted average value of the path losses obtained at the transmission opportunities $T_{0-x}$ to $T_{0-1}$, or $PL_{sensing}(T_{0-x\ to\ 0-1})$ may be a path loss obtained at the current transmission opportunity through estimation based on the path losses obtained at the transmission opportunities $T_{0-x}$ to $T_{0-1}$ and a movement rule and/or a change of a propagation environment of the terminal device.

For example, if the sensing measurement result is a speed-speed spectrum obtained after radar processing, the terminal device may determine a distance and a speed of the sensing target based on a speed-speed spectrum of the one or more transmission opportunities before the transmission opportunity $T_0$, then determine a distance from the terminal device to the sensing target at the current transmission opportunity based on a time interval between transmission opportunities, and determine the first path loss based on the distance from the terminal device to the sensing target at the current transmission opportunity.

For example, if a time interval between the current transmission opportunity $T_0$ and the previous transmission opportunity $T_{0-1}$ is relatively long, a movement of the sensing target or a change of a surrounding environment may cause a relatively large difference between the two actual path losses. If the path loss of the sensing signal at the previous transmission opportunity $T_{0-1}$ is used to estimate the path loss of the sensing signal at the current transmission opportunity $T_0$, the estimated path loss may be inaccurate, and one sensing measurement may be increased. After the increase, the increased sensing measurement may be considered as sensing measurement of the previous transmission opportunity $T_{0-1}$ of the current transmission opportunity $T_0$.

During the increased sensing measurement, the sensing target may be simply sensed. For example, the sensing signal occupies a small quantity of time domain resources, and the terminal device may send the sensing signal to a specific sensing target, and perform sensing beam scanning on the specific sensing target, to obtain a sensing measurement result. In this way, a more accurate first path loss can be obtained based on the sensing measurement result, and sensing performance of the terminal device can be ensured.

In an actual application scenario, a mode in which the terminal device performs target detection may be classified into a tracking mode and a blind scanning mode. For example, in the tracking mode, the terminal device detects a specific sensing target, and a beam direction corresponding to a signal may be sent to the specific sensing target. In the blind scanning mode, the terminal device sends a sensing signal based on a configured scanning pattern (that is, a scanning direction, a scanning time, a periodicity, and the like of a sensing beam), and may cover a plurality of sensing targets in a scanning range of the terminal device. In the two modes, the terminal device may determine the first path loss in any one or more of the foregoing manners.

The sensing beam may be considered as a spatial representation form of the sensing signal. In other words, the sensing signal may be carried on the sensing beam for sending.

When the power control apparatus 500 is a terminal device, the processor 501 in the power control apparatus 500 may be configured to determine a first path loss. Optionally, the processor 501 is further configured to perform any one or more possible processing functions of the terminal device in S701, and the transceiver 503 may be configured to perform any one or more possible receiving and sending functions of the terminal device in S701.

When the power control apparatus 600 is a terminal device, the processing module 602 in the power control apparatus 600 may be configured to determine a first path loss. Optionally, the processing module 602 may be further configured to perform any one or more possible processing functions of the terminal device in S701, and the transceiver module 601 may be configured to perform any one or more possible receiving and sending functions of the terminal device in S701.

When the power control apparatus 500 is a network device, the processor 501 in the power control apparatus 500 may be configured to perform any one or more possible processing functions of the network device in S701, and the transceiver 503 may be configured to perform any one or more possible receiving and sending functions of the network device in S701.

When the power control apparatus 600 is a network device, the processing module 602 in the power control apparatus 600 may be configured to perform any one or more possible processing functions of the network device in S701, and the transceiver module 601 may be configured to perform any one or more possible receiving and sending functions of the network device in S701.

S702: The terminal device determines a transmit power of the first signal based on the first path loss.

In a possible manner, S702 in which the terminal device determines a transmit power of the first signal based on the first path loss may include: the terminal device determines the transmit power of the first signal based on first power control indication information and the first path loss.

Optionally, the first power control indication information may include a parameter used to obtain the transmit power of the first signal.

Optionally, the first power control indication information may be determined by the network device and sent to the terminal device.

In some embodiments, the method provided in this embodiment may further include: S702-1: the network device determines first indication information.

Optionally, the first indication information may include the first power control indication information.

In some embodiments, the method provided in this embodiment may further include: S702-2: the network device sends the first indication information to the terminal device. Correspondingly, the terminal device receives the first indication information from the network device.

Optionally, the first indication information may be sent by using, but not limited to, one or more of the following signaling: DCI, MAC signaling, and RRC signaling.

In other words, the network device may send the first power control indication information to the terminal device by using one or more pieces of signaling.

In some embodiments, the first power control indication information may include a first expected transmit power and a first maximum transmit power.

Optionally, the network device may determine one or more first expected transmit powers and one or more first maximum transmit powers.

When the network device determines one first expected transmit power and one first maximum transmit power, the first power control indication information may be sent by using the DCI, the MAC signaling, or the RRC signaling.

When the network device determines a plurality of first expected transmit powers and a plurality of first maximum transmit powers, the first power control indication information may be sent by using the DCI, the MAC signaling, or the RRC signaling. For example, the network device sends one first expected transmit power and one first maximum transmit power to the terminal device.

When the network device determines a plurality of first expected transmit powers and a plurality of first maximum transmit powers, the first power control indication information may be sent by using the RRC signaling and the DCI.

For example, the RRC signaling includes a first expected transmit power 1, a first expected transmit power 2, a first maximum transmit power 1, and a first maximum transmit power 2, and the DCI indicates the first expected transmit power 1 and the first maximum transmit power 1. In other words, the first power control indication information may be configured by using the RRC signaling, and a to-be-used parameter index may be indicated by using the DCI. For example, if the DCI includes the first expected transmit power 1 and the first maximum transmit power 1, or an identifier of the first expected transmit power 1 and an identifier of the first maximum transmit power 1, the terminal device may perform power control by using the first expected transmit power 1 and the first maximum transmit power 1.

Optionally, the first expected transmit power may indicate an expected transmit power that meets a target detection requirement of the terminal device.

For example, a first expected transmit power $P_0$ represents a transmit power of the terminal device that is expected when a sensing result (for example, a signal-to-noise ratio, a target detection probability, or distance/speed estimation precision) of performing target detection by the terminal device can meet a sensing system requirement.

For example, the first indication information is RRC signaling. The RRC signaling may include a sense power control information element (SENSE-PowerControl IE), and the sense power control information element may be used to configure the first expected transmit power $P_0$.

It should be noted that the embodiment is not limited to use of the sense power control information element. Alternatively, another element may be used, or a name of the sense power control information element is not limited. This is also applicable to the sense power control information element in another example.

Optionally, the first maximum transmit power may indicate a maximum power for sending the first signal.

For example, the first maximum transmit power is less than or equal to a maximum transmit power of the terminal device, and the transmit power of the first signal is less than or equal to the first maximum transmit power.

In other words, a transmit power P for sending the first signal by the terminal device needs to be less than or equal to a specified maximum power (that is, a first maximum transmit power $P_2$) for sending the first signal.

For example, the first maximum transmit power may be determined based on the maximum transmit power of the terminal device and a proportional coefficient. Optionally, a value of the proportional coefficient is greater than or equal to 0 and less than or equal to 1. The first maximum transmit power is equal to a product of the maximum transmit power of the terminal device and the proportional coefficient.

Optionally, the proportional coefficient may be configured for the terminal device by using the DCI, the MAC signaling, or the RRC signaling.

For example, the first maximum transmit power may be determined based on a target detection probability curve.

For example, a range of an SNR that is obtained after radar processing and that meets an expected target detection probability threshold (for example, greater than or equal to 90%) is obtained based on the target detection probability curve. Further, based on factors such as a radar processing gain, an expected detection distance, and an RCS of a sensing target, a value range of a transmit power that can meet the expected target detection probability threshold is estimated, to configure a value of a maximum transmit power of the first signal.

In a possible manner, that the terminal device determines the transmit power of the first signal based on first power control indication information and the first path loss may include: the terminal device may determine the transmit power of the first signal based on the first expected transmit power, the first maximum transmit power, and the first path loss.

For example, the terminal device may determine one transmit power based on the first expected transmit power and the first path loss, and then determine a final transmit power under a constraint of the first maximum transmit power. For example, transmit power of the first signal=min{first maximum transmit power, first expected transmit power+first path loss}. In this way, the transmit power of the first signal can be dynamically adjusted.

In some embodiments, the first power control indication information may further include a first power adjustment value and/or a first path loss compensation factor $\alpha$.

Optionally, the first power adjustment value may include one or more of the following: a closed-loop power correction value of the first signal, a modulation and coding scheme (MCS)-related power adjustment value of the first signal, and an occupied resource-related power adjustment value of the first signal.

Optionally, the first path loss compensation factor $\alpha$ represents a proportion of path loss compensation corresponding to transmission of the first signal by the terminal device, and a value range is $\alpha \in [0,1]$.

In a possible manner, that the terminal device determines the transmit power of the first signal based on first power control indication information and the first path loss may include: the terminal device may determine the transmit power of the first signal based on the first expected transmit power, the first maximum transmit power, the first path loss, and the first path loss compensation factor.

For example, the terminal device may determine one transmit power based on the first expected transmit power, the first path loss, and the first path loss compensation factor, and then determine a final transmit power under a constraint of the first maximum transmit power. For example, transmit power of the first signal=min{first maximum transmit power, first expected transmit power+first path loss×first path loss compensation factor}. In this way, the transmit power of the first signal can be dynamically adjusted. In some embodiments, a power control mechanism may be classified into open-loop power control and closed-loop power control.

For example, during the open-loop power control, the terminal device determines the transmit power by using a power setting algorithm of the terminal device. An input of the power setting algorithm may be from an internal setting of the terminal device or measurement data of the terminal device. During the closed-loop power control, the network device sends feedback information to the terminal device based on a received sensing result (for a sensing signal) or communication signal strength (for a communication signal), and the terminal device may perform power adjustment based on the feedback information of the network device.

For example, an open-loop power control parameter may include, but is not limited to, one or more of the following: the first expected transmit power $P_0$, the first path loss compensation factor $\alpha$, the MCS-related power adjustment value of the first signal, and the occupied resource-related power adjustment value of the first signal.

For example, a closed-loop power control parameter may include a power adjustment value (that is, a closed-loop power correction value of the first signal) related to the closed-loop power control.

The following describes the first power adjustment value.

In some embodiments, the first power adjustment value may include the closed-loop power correction value of the first signal.

For example, the closed-loop power correction value of the first signal may be determined by the network device based on the sensing measurement result of the terminal device, so that the terminal device further adjusts the transmit power of the first signal, thereby further improving power control precision.

TABLE 1

| TPC command field value | Closed-loop power correction value-cumulative calculation (dB) | Closed-loop power correction value-absolute calculation (dB) |
|---|---|---|
| 0 | −0.5 | −1 |
| 1 | 0 | −0.5 |
| 2 | 0.5 | 0 |
| 3 | 1 | 0.5 |

For example, the closed-loop power correction value of the first signal may be indicated by using the transmit power control (TPC) command field. A mapping relationship between the TPC command field and the closed-loop power correction value of the first signal is shown in Table 1. Similar to the manner of determining the first path loss, a manner of determining the closed-loop power correction value of the first signal may include cumulative calculation and absolute calculation. In this way, Table 1 shows mapping relationships between the TPC command field and the closed-loop power correction value of the first signal in a cumulative calculation case and an absolute calculation case.

Considering that the target detection probability is relatively sensitive to a change of a signal-to-noise ratio (post-SNR) obtained after radar processing, for example, if the post-SNR is reduced by 1 dB, the target detection probability may be reduced by 10%. Therefore, a change step of the closed-loop power correction value of the first signal may be reduced, to ensure a sensing precision requirement.

Optionally, the closed-loop power correction value of the first signal may be less than a closed-loop power correction value of the communication signal.

For example, the step of the closed-loop power correction value of the first signal is less than a step (for example, 1 dB) of the closed-loop power correction value configured by the communication signal. As shown in Table 1, a difference between closed-loop power correction values corresponding to adjacent values of the TPC command field is 0.5 dB.

It should be noted that Table 1 is merely an example, and the step of the closed-loop power correction value of the first signal and a quantity of closed-loop power correction values are not limited in this embodiment. In addition, a step of a closed-loop power correction value of the cumulative calculation corresponding to the first signal may be different from a step of a closed-loop power correction value of the absolute calculation.

For the cumulative calculation, a closed-loop power correction value of the first signal at the current transmission opportunity may be expressed as follows: $f_{sensing}(T_0)=f_{sensing}(T_{0-1})+\delta_{sensing}$. $f_{sensing}(T_{0-1})$ is a closed-loop power correction value at the previous transmission opportunity $T_{0-1}$, and $\delta_{sensing}$ is a closed-loop power correction value determined by the terminal based on the received TPC command field at the current transmission opportunity.

In other words, the terminal device may determine, based on the received TPC command and the closed-loop power correction value for transmitting the first signal at the previous transmission opportunity $T_{0-1}$, the closed-loop power correction value for transmitting the first signal at the current transmission opportunity.

For the absolute calculation, a closed-loop power correction value of the first signal at the current transmission opportunity may be expressed as follows: $f_{sensing}(T_0)=\delta_{sensing}$. $\delta_{sensing}$ is a closed-loop power correction value determined by the terminal based on the received TPC command field at the current transmit opportunity.

In other words, the terminal device may directly determine, based on the received TPC command, the closed-loop power correction value for transmitting the first signal.

Further, a manner in which the terminal determines the closed-loop power correction value of the first signal (that is, whether the cumulative calculation or the absolute calculation is used) depends on a configuration of higher layer signaling.

In other words, the closed-loop power correction value of the first signal may be determined based on the closed-loop power correction value at the previous transmission opportunity $T_{0-1}$ and the closed-loop power correction value indicated by the TPC command field at the current transmission opportunity, or may be determined based on only the closed-loop power correction value indicated by the TPC command field at the current transmission opportunity.

It should be noted that the manner of determining the closed-loop power correction value of the first signal is similar to the manner of determining the first path loss. For details, refer to the foregoing specific implementation of determining the first path loss. Details are not described herein again. For example, the closed-loop power correction value of the first signal may be determined based on a closed-loop power correction value at one or more transmission opportunities before the transmission opportunity $T_0$. For example, one transmission opportunity before the transmission opportunity $T_0$ may be a previous transmission opportunity, or may be any transmission opportunity before the transmission opportunity $T_0$, and a plurality of transmission opportunities before the transmission opportunity $T_0$ may be a plurality of latest transmission opportunities, or may be any plurality of transmission opportunities before the transmission opportunity $T_0$. This is not limited.

Optionally, the sense power control information element may be further used to configure a mapping relationship between the first power adjustment value or the TPC command field and a sense power closed-loop power correction value.

In some embodiments, the first power adjustment value may include the MCS-related power adjustment value of the first signal.

In other words, the terminal device may perform power control on the first signal by adjusting an MCS.

For example, if the terminal device transmits a predefined sequence, for example, an SRS, a DMRS, or another possible signal dedicated for detection, the MCS does not need to be considered, that is, the first power control indication information for determining the transmit power of the first signal may not include the MCS-related power adjustment value of the first signal.

In some embodiments, the first power adjustment value may include the occupied resource-related power adjustment value of the first signal.

In other words, the terminal device may perform power control on the first signal by adjusting a resource (for example, a quantity of RBs) occupied by the first signal.

In a possible manner, that the terminal device determines the transmit power of the first signal based on first power control indication information and the first path loss may include: the terminal device may determine the transmit power of the first signal based on the first expected transmit power, the first maximum transmit power, the first power adjustment value, and the first path loss.

For example, transmit power of the first signal=min{first maximum transmit power, first expected transmit power+first path loss×first path loss compensation factor+occupied resource-related power adjustment value of the first signal+closed-loop power correction value of the first signal+MCS-related power adjustment value of the first signal}. The recorded first power adjustment value may include one or more of the closed-loop power correction value of the first signal, the MCS-related power adjustment value of the first signal, and the occupied resource-related power adjustment value of the first signal. In the foregoing formula, the occupied resource-related power adjustment value of the first signal is optional, the closed-loop power correction value of the first signal is optional, the MCS-related power adjustment value is optional, and the first path loss compensation factor is optional.

Optionally, the network device may determine one or more first expected transmit powers and one or more first maximum transmit powers.

When the first power control indication information includes one first expected transmit power and one first maximum transmit power, the first power control indication information may be sent by using the DCI, the MAC signaling, or the RRC signaling.

When the first power control indication information includes a plurality of first expected transmit powers and a plurality of first maximum transmit powers, the first power control indication information may be sent by using the RRC signaling and the DCI.

For example, the RRC signaling includes a first expected transmit power 1, a first expected transmit power 2, a first maximum transmit power 1, and a first maximum transmit power 2, and the DCI indicates the first expected transmit power 1 and the first maximum transmit power 1. In other words, the first power control indication information may be configured by using the RRC signaling, and a to-be-used parameter is activated by using the DCI. For example, if the DCI includes the first expected transmit power 1 and the first maximum transmit power 1, or an identifier of the first expected transmit power 1 and an identifier of the first maximum transmit power 1, the terminal device may perform power control by using the first expected transmit power 1 and the first maximum transmit power 1.

Optionally, the DCI may alternatively be group DCI, that is, a plurality of terminal devices share one piece of DCI.

The following describes a transmit power corresponding to the first signal in a serving cell c, a carrier frequency f, and an uplink bandwidth part (UL BWP) b at a transmission opportunity i. When the current transmission opportunity is $T_0$, $i=T_0$.

For example, the first signal is carried on the SRS signal for sending, and the MCS does not need to be considered. The transmit power corresponding to the first signal at the transmission opportunity i may meet the following formula:

$$P_{sensing,b,f,c}(i,x) = \min\left\{\begin{matrix} P_{sensingMAX,f,c}(i), \\ P_{O\_sensing,b,f,c}(x) + 10\log_{10}\left(2^{\mu}\times M_{RB,b,f,c}^{sensing}(i)\right) + \\ PL_{sensing}(i) + f_{sensing,b,f,c}(i,y) \end{matrix}\right\}.$$

In the foregoing formula, x represents the first expected transmit power $P_0$ and/or an index of the first path loss compensation factor α of the open-loop power control parameter, and y represents an adjustment state index of the closed-loop power control parameter.

$P_{sensing,b,f,c}(i, x)$ represents a transmit power of the terminal device in the serving cell c, the carrier frequency f, and the UL BWP b at the transmission opportunity i.

$P_{sensingMAX,f,c}(i)$ represents the first maximum transmit power. $P_{O\_sensing,b,f,c}(x)$ is the first expected transmit power. In other words, the terminal obtains, based on the open-loop power control parameter index indicated by the DCI, the first expected transmit power from a set of power parameters $P_0$ that are configured by a higher layer and that are used for sensing.

$$10\log_{10}\left(2^{\mu}\times M_{RB,b,f,c}^{sensing}(i)\right)$$

represents the occupied resource-related power adjustment value of the first signal.

$$M_{RB,b,f,c}^{sensing}(i)$$

represents a quantity of RBs occupied by the first signal of the terminal device in the serving cell c, the carrier frequency f, and the UL BWP b at the transmission opportunity i, and μ is a subcarrier spacing (SCS)-related factor.

$PL_{sensing}(i)$ represents the first path loss. Optionally, the first path loss compensation factor $\alpha_{sensing,b,f,c}(x)$ is introduced, and the corresponding first path loss may be represented as $\alpha_{sensing,b,f,c}(x)\times PL_{sensing}(i)$.

$h_{sensing,b,f,c}(i,y)$ is the closed-loop power correction value of the first signal.

In this way, the terminal device may dynamically adjust transmit powers of the first signals in different serving cells and different carrier frequencies, so that sensing performance of the terminal device can be ensured. In addition, the terminal device may perform target detection at a proper and relatively low transmit power, so that a system throughput can be maximized and power consumption of the terminal device can be minimized while the sensing performance of the terminal device is ensured.

In a possible manner, the first indication information may further include first time domain resource configuration information and first frequency domain resource configuration information.

In this way, the terminal device can determine, based on the first indication information, a time-frequency resource occupied for sending the first signal.

Optionally, the first time domain resource configuration information may indicate a time domain resource of the first signal, and the first frequency domain resource configuration information may indicate a frequency domain resource of the first signal.

For example, the first time domain resource configuration information may include a time domain start symbol index and a quantity of symbols of the first signal; or the time domain resource configuration information of the first signal may include an index of a symbol occupied by the first signal in time domain.

For example, the first time domain resource configuration information may include a resource periodicity and a time offset. The resource periodicity may be set to periodic, semi-persistent, and aperiodic transmission. For the periodic and semi-persistent transmission, a slot location occupied by the first signal may be determined by using a configured resource sending periodicity and a configured time offset. The aperiodic transmission may indicate each sending of the first signal of the terminal device by using the DCI signaling.

For example, the first frequency domain resource configuration information may include an index of a start RB occupied by the first signal in frequency domain, an RB length, and a frequency domain resource density.

Optionally, the network device may determine resource configuration information of the first signal based on a type of the terminal device.

For example, the terminal device may report the type of the terminal device to the network device, and request the resource configuration information used for sensing. The network device receives the type and the request of the terminal device, and sends the resource configuration information of the first signal to the terminal device. The resource configuration information of the first signal may include the first time domain resource configuration information and the first frequency domain resource configuration information.

In another possible manner, the first time domain resource configuration information and the first frequency domain resource configuration information may be predefined.

For example, a time-frequency resource configuration pattern set of the first signal is predefined by using the higher layer signaling (for example, the RRC signaling or the MAC signaling), and the time-frequency resource configuration pattern set includes one or more time-frequency resource patterns. The network device indicates a time-frequency resource pattern index of the first signal to the terminal device by using the DCI signaling.

Optionally, resource configuration information of the first signal corresponding to different slots may be the same or different.

With reference to (c) in FIG. 2, if resource configurations of the first signal in all slots are the same, one piece of resource configuration information of the first signal may be configured for the terminal device. With reference to (d) in FIG. 2, if resource configurations of the first signal in all slots are different, a plurality of pieces of resource configuration information of the first signal may be configured for the terminal device.

In a possible manner, the method provided in this embodiment may further include: the terminal device determines a time-frequency resource of the first signal based on the first time domain resource configuration information and the first frequency domain resource configuration information.

When the power control apparatus 500 is a terminal device, the processor 501 in the power control apparatus 500 may be configured to determine a transmit power of the first signal based on the first path loss. Optionally, the processor 501 is further configured to perform any one or more possible processing functions of the terminal device in S702, and the transceiver 503 may be configured to perform any one or more possible receiving and sending functions of the terminal device in S702.

When the power control apparatus 600 is a terminal device, the processing module 602 in the power control apparatus 600 may be configured to determine a transmit power of the first signal based on the first path loss. Optionally, the processing module 602 may be further configured to perform any one or more possible processing functions of the terminal device in S702, and the transceiver module 601 may be configured to perform any one or more possible receiving and sending functions of the terminal device in S702.

When the power control apparatus 500 is a network device, the processor 501 in the power control apparatus 500 may be configured to determine first indication information, and the transceiver 503 may be configured to send the first indication information to the terminal device. Optionally, the processor 501 may be further configured to perform any one or more possible processing functions of the network device in S702, and the transceiver 503 may be configured to perform any one or more possible receiving and sending functions of the network device in S702.

When the power control apparatus 600 is a network device, the processing module 602 in the power control apparatus 600 may be configured to determine first indication information, and the transceiver module 601 may be configured to send the first indication information to the terminal device. The processing module 602 may be further configured to perform any one or more possible processing functions of the network device in S702, and the transceiver module 601 may be further configured to perform any one or more possible receiving and sending functions of the network device in S702.

S703: The terminal device sends the first signal based on the transmit power.

In this way, the terminal device may send the first signal based on the transmit power determined in S702, so that sensing performance of the terminal device can be ensured, and sensing precision can be improved.

Optionally, S703 in which the terminal device sends the first signal based on the transmit power may include: the terminal device sends the first signal on the time-frequency resource of the first signal by using the determined transmit power.

In a possible manner, the method provided in this embodiment may further include: S704: the terminal device obtains a sensing measurement result.

Optionally, the sensing measurement result may include, but is not limited to, one or more of the following: a path loss, a receive power of an echo signal, a sensing target attribute value (or referred to as a speed-distance spectrum, for example, an attribute such as a speed, a distance, or a movement direction) obtained after radar processing, a signal-to-noise ratio on a resource of the first signal, and a target detection probability.

It should be noted that the radar processing may be performed by the terminal device, or may be performed by the network device. This is not limited.

In a possible manner, the method provided in this embodiment may further include: S705: the terminal device sends the sensing measurement result to the network device. Correspondingly, the network device receives the sensing measurement result from the terminal device.

For example, the terminal device may send the sensing measurement result to the network device in a manner of reporting by using a physical layer or reporting by using higher layer signaling.

Optionally, the network device may determine, based on the sensing measurement result, the first information and/or a closed-loop power correction value of the first signal at a next transmission opportunity. In this way, during the closed-loop power control, the network device sends the first information and/or the closed-loop power correction value of the first signal to the terminal device, so that the terminal device adjusts the transmit power of the first signal based on the first information and/or the closed-loop power correction value of the first signal that are/is fed back.

When the power control apparatus 500 is a terminal device, the transceiver 503 in the power control apparatus 500 may be configured to send the first signal based on the transmit power. Optionally, the processor 501 is configured to perform any one or more possible processing functions of the terminal device in S703, and the transceiver 503 may be further configured to perform any one or more possible receiving and sending functions of the terminal device in S703.

When the power control apparatus 600 is a terminal device, the transceiver 503 in the power control apparatus 600 may be configured to send the first signal based on the transmit power. Optionally, the processing module 602 may be configured to perform any one or more possible processing functions of the terminal device in S703, and the transceiver module 601 may be further configured to perform any one or more possible receiving and sending functions of the terminal device in S703.

When the power control apparatus 500 is a network device, the processor 501 in the power control apparatus 500 may be configured to perform any one or more possible processing functions of the network device in S703, and the transceiver 503 may be configured to perform any one or more possible receiving and sending functions of the network device in S703.

When the power control apparatus 600 is a network device, the processing module 602 in the power control apparatus 600 may be configured to perform any one or more possible processing functions of the network device in S703, and the transceiver module 601 may be configured to perform any one or more possible receiving and sending functions of the network device in S703.

According to the power control method shown in FIG. 7, the terminal device determines the transmit power of the first signal based on the loss of the path for performing target detection. In the target detection process, after the terminal device sends a signal, the signal may pass through one sensing target and then be reflected to the terminal device, or the signal may sequentially pass through a plurality of sensing targets and then be reflected to the terminal device. In this way, the transmit power of the first signal is determined based on a loss in a target detection scenario, and the first signal is sent by using the determined transmit power, so that sensing performance of the terminal device can be ensured, and sensing precision can be improved.

For example, FIG. 8 is a schematic flowchart of another power control method according to an embodiment. The power control method is applicable to communication between the network device and the terminal device and communication between the terminal device and the sensing device shown in FIG. 1. The method shown in FIG. 8 describes a power control method for a first signal and a second signal in a communication and sensing integration system.

As shown in FIG. 8, the power control method includes the following steps.

S801: A terminal device determines a first path loss.

For a specific implementation of S801, refer to S701. Details are not described herein again.

S802: The terminal device determines a transmit power of the first signal and a transmit power of the second signal.

For example, the second signal may be a communication signal or a sensing signal.

It should be noted that an example in which the second signal is a communication signal is used for description in this embodiment. Alternatively, the second signal may be a sensing signal. Layered transmission of a plurality of sensing signals may be performed. When the second signal is a sensing signal, for a function that can be implemented by the terminal device and that is related to the second signal and a specific implementation, refer to the first signal. For example, for a method in which the terminal device determines the transmit power of the second signal, refer to S702. Details are not described again.

If layered transmission of the first signal and the second signal is performed on two beams, there are X×Y possible manners of carrying the first signal and the second signal. Herein, X is a signal or channel type that supports sending of the first signal, and Y is a signal or channel type that supports sending of the second signal.

The following describes a specific implementation of S802 in a scenario in which a resource multiplexing manner of the first signal and the second signal is time division multiplexing.

When the resource multiplexing manner of the first signal and the second signal is the time division multiplexing, for a method in which the terminal device determines the transmit power of the first signal in S802, refer to S702. Details are not described herein again.

In a possible manner, the terminal device may determine the transmit power of the second signal based on second power control indication information and a second path loss.

Optionally, the second path loss is a path loss of the communication signal.

For example, the second path loss may be a downlink loss calculated by the terminal device by using a reference signal. The reference signal may be a channel state information reference signal (CSI-RS) or the like. Optionally, similar to the first power control indication information, the second power control indication information may indicate the transmit power of the second signal.

In other words, different power control parameters may be configured for the first signal and the second signal, to determine the transmit power of the first signal and the transmit power of the second signal respectively based on different requirements of the first signal and the second signal.

Optionally, the second power control indication information may include a second expected transmit power and a second maximum transmit power.

For example, the second expected transmit power may indicate an expected transmit power that meets a communication requirement.

For sensing, the terminal device estimates an attribute of a sensing target by sending the first signal and receiving an echo signal, that is, a transmit power of the terminal device needs to undergo attenuation caused by two transmissions between the terminal device and the sensing target. Therefore, to meet a target detection requirement in a sensing scenario, a minimum value of an expected transmit power set configured by a network device for sensing may be greater than a minimum value of a communication signal.

For example, the second maximum transmit power may indicate a maximum power for sending the second signal.

In some embodiments, the second maximum transmit power is less than or equal to a maximum transmit power of the terminal device, and the transmit power of the second signal is less than or equal to the second maximum transmit power. This is applicable to a case in which the resource multiplexing manner of the first signal and the second signal is the time division multiplexing.

In other words, when the resource multiplexing manner of the first signal and the second signal is the time division multiplexing, the transmit power for sending the second signal by the terminal device needs to be less than or equal to a specified maximum power for sending the second signal.

Optionally, the sensing target is detected in real time, that is, the terminal device needs to effectively estimate the attribute of the sensing target by receiving the echo signal in a very short time, so that reliability of a sensing system of the terminal device is improved. Therefore, to meet time validity and reliability of target detection and road condition information collection, a maximum transmit power (that is, the first maximum transmit power) of the first signal may need to be different from a maximum transmit power (that is, the second maximum transmit power) of the second signal.

It should be noted that, when the resource multiplexing manner of the first signal and the second signal is the time division multiplexing, a specific implementation in which the terminal device determines the transmit power of the second signal based on the second expected transmit power, the second maximum transmit power, and the second path loss is similar to the implementation in which the terminal device determines the transmit power of the first signal based on the first expected transmit power, the first maximum transmit power, and the first path loss in S702. Details are not described herein again.

In some embodiments, the second power control indication information may further include a second power adjustment value and/or a second path loss compensation factor.

Optionally, similar to the first power adjustment value, the second power adjustment value may include one or more of the following: a closed-loop power correction value of the second signal, an MCS-related power adjustment value of the second signal, and an occupied resource-related power adjustment value of the second signal.

Optionally, the second path loss compensation factor represents a corresponding path loss compensation proportion for transmitting the second signal by the terminal device, and a value of the second path loss compensation factor is greater than or equal to 0 and less than or equal to 1.

For example, the second power adjustment value may include the closed-loop power correction value of the second signal.

For example, the closed-loop power correction value of the second signal may be indicated by using a TPC command field. A mapping relationship between the TPC command field and the closed-loop power correction value of the second signal is shown in Table 2. Table 2 shows mapping relationships between the TPC command field and the closed-loop power correction value of the second signal in a cumulative calculation case and an absolute calculation case.

As shown in Table 2, a step of the closed-loop power correction value of the second signal is greater than or equal to 1 dB. As described in S702, the closed-loop power correction value of the second signal may be greater than the closed-loop power correction value of the first signal.

TABLE 2

| TPC command field value | Closed-loop power correction value of the second signal-cumulative calculation (dB) | Closed-loop power correction value of the second signal-absolute calculation (dB) |
|---|---|---|
| 0 | −1 | −4 |
| 1 | 0 | −1 |
| 2 | 1 | 1 |
| 3 | 3 | 4 |

Considering that a range of a change of a signal-to-noise ratio that is obtained after radar processing and that corresponds to a change of a target detection probability from 0 to 1 is relatively small in the sensing scenario, transmit power adjustment and changing have a relatively large impact on sensing target detection precision. Therefore, a step of the closed-loop power correction value of the first signal may be different from the step of the closed-loop power correction value of the second signal.

For the cumulative calculation and the absolute calculation, for a specific implementation of determining a closed-loop power correction value of the second signal at a current transmission opportunity, refer to the implementation of determining the closed-loop power correction value of the first signal in S702. Details are not described herein again.

In some embodiments, the second power adjustment value may include the MCS-related power adjustment value of the second signal. For a specific implementation, refer to the implementation corresponding to the first power adjustment value in S702. Details are not described herein again.

In some embodiments, the second power adjustment value may include the occupied resource-related power adjustment value of the second signal.

In a possible manner, S802 in which the terminal device determines a transmit power of the second signal may include: the terminal device may determine the transmit power of the second signal based on the second expected transmit power, the second maximum transmit power, the second power adjustment value, and the second path loss.

For example, transmit power of the second signal=min{second maximum transmit power, second expected transmit power+second path loss×second path loss compensation factor+occupied resource-related power adjustment value of the second signal+closed-loop power correction value of the second signal+MCS-related power adjustment value of the second signal}. The recorded second power adjustment value may include one or more of the closed-loop power correction value of the second signal, the MCS-related power adjustment value of the second signal, and the occupied resource-related power adjustment value of the second signal. In the foregoing formula, the occupied resource-related power adjustment value of the second signal is optional, the closed-loop power correction value of the second signal is optional, the MCS-related power adjustment value of the second signal is optional, and the second path loss compensation factor is optional.

Optionally, the network device may determine one or more second expected transmit powers and one or more second maximum transmit powers. A specific implementation is similar to an implementation corresponding to the first expected transmit power and the first maximum transmit power. Details are not described herein again.

For example, the first signal is carried on an SRS, and the second signal is carried on a PUSCH for layered sending. If no first signal is sent on a scheduled PUSCH symbol, that is, the terminal device sends only the second signal in this case, the terminal device may use the following PUSCH power control formula:

$$P_{PUSCH,b,f,c}(i, j, q_d, l) = \min \left\{ \begin{array}{l} P_{CMAX,f,c}(i), \\ P_{O\_PUSCH,b,f,c}(j) + 10\log_{10}(2^{\mu} \cdot M_{RB,b,f,c}^{PUSCH}(i)) + \alpha_{b,f,c}(j) \cdot PL_{b,f,c}(q_d) + \\ \quad \Delta_{TF,b,f,c}(i) + f_{b,f,c}(i, l) \end{array} \right\},$$

to determine the transmit power of the second signal.

$P_{PUSCH,b,f,c}(i,q_d,l)$ represents a transmit power of the terminal device in a serving cell c, a carrier frequency f, and an uplink bandwidth part b at a transmission opportunity i, $q_d$ is a reference signal (reference signal, RS) resource index, l is a power control adjustment state index configured by a higher layer, and a value of a parameter j configured by the higher layer may be {0, 1, . . . , J−1}.

$P_{CMAX,f,c}(i)$ represents the maximum transmit power of the terminal device, or may be replaced with the second maximum transmit power. $P_{O\_PUSCH,b,f,c}(j)$ is the second expected transmit power.

$$10\log_{10}\left(2^{\mu}\cdot M_{RB,b,f,c}^{PUSCH}(i)\right)$$

represents the occupied resource-related power adjustment value of the second signal.

$$M_{RB,b,f,c}^{PUSCH}(i)$$

represents a quantity of RBs occupied by the second signal of the terminal device in the serving cell c, the carrier frequency f, and the UL BWP b at the transmission opportunity i, and p is an SCS-related factor.

$\alpha_{b,f,c}(j)$ represents the second path loss compensation factor, $PL_{b,f,c}(q_d)$ represents the second path loss, $\Delta_{TF,b,f,c}(i)$ represents the MCS-related power adjustment value of the second signal, and $f_{b,f,c}(i,l)$ is the closed-loop power correction value of the second signal.

In a possible manner, the first indication information may further include first time domain resource configuration information and first frequency domain resource configuration information. A specific implementation is the same as the corresponding implementation in S702. Details are not described herein again.

In a possible manner, the method provided in this embodiment may further include: the terminal device determines a time-frequency resource of the first signal based on the first time domain resource configuration information and the first frequency domain resource configuration information. A specific implementation is the same as the corresponding implementation in S702. Details are not described herein again.

In a possible manner, the first indication information may further include second time domain resource configuration information and second frequency domain resource configuration information.

Optionally, the second time domain resource configuration information may indicate a time domain resource of the second signal, and the second frequency domain resource configuration information may indicate a frequency domain resource of the second signal. For a specific implementation, refer to an implementation corresponding to the first time domain resource configuration information and the first frequency domain resource configuration information in S702.

In a possible manner, the method provided in this embodiment may further include: the terminal device determines a time-frequency resource of the second signal based on the second time domain resource configuration information and the second frequency domain resource configuration information.

In this way, the terminal device can determine, based on the first indication information, a time-frequency resource occupied for sending the first signal.

The foregoing describes power control and resource configuration solutions used when a sensing signal and a communication signal are sent on different time domain symbols. The following describes power control and resource configuration solutions used when time domain resources of a sensing signal and a communication signal overlap.

Resource configurations of the first signal and the second signal may partially or completely overlap. As shown in (a) in FIG. 4, the resource configurations of the first signal and the second signal may partially overlap. As shown in (b) in FIG. 4, the resource configurations of the first signal and the second signal may completely overlap.

For a power control solution and a resource configuration solution for sending the second signal on non-overlapped symbols 0 to 5 and symbols 9 to 12 in (a) in FIG. 4, refer to the power control solution and the resource configuration solution for the second signal that are used when the resource multiplexing manner of the first signal and the second signal is the time division multiplexing in S802. For a power control solution and a resource configuration solution for sending the first signal on a non-overlapped symbol 8, refer to S702. Details are not described herein again. For a power control solution and a resource configuration solution for sending the first signal and the second signal on overlapped symbols 6, 7, and 13, refer to the following solutions.

For a power control solution and a resource configuration solution for sending the first signal and the second signal on overlapped symbols 0 to 13 in (b) in FIG. 4, refer to the following solutions.

That the terminal device determines the transmit power of the first signal is similar to S702. The terminal device may determine the transmit power of the first signal based on the first path loss. Optionally, the terminal device determines the transmit power of the first signal based on the first power control indication information and the first path loss. For a specific implementation, refer to the corresponding implementation in S702. Details are not described herein again.

In some embodiments, the method provided in this embodiment may further include: S802-1: the network device determines first indication information. For a specific implementation, refer to S702-1. Details are not described herein again.

In some embodiments, the method provided in this embodiment may further include: S802-2: the network device sends the first indication information to the terminal device. Correspondingly, the terminal device receives the first indication information from the network device. For a specific implementation, refer to S702-2. Details are not described herein again.

For implementations of the first power control indication information, the first indication information, and the like, refer to S702.

In a possible manner, a time domain resource of the first signal and a time domain resource of the second signal completely or partially overlap, and on the overlapped time domain resource, a sum of the transmit power of the first signal and the transmit power of the second signal is less than or equal to the maximum transmit power of the terminal device.

Optionally, on the overlapped time domain resource, the sum of the transmit power of the first signal and the transmit power of the second signal is less than or equal to a first power threshold, and the first power threshold is less than or equal to the maximum transmit power of the terminal device. The first power threshold may be predefined.

With reference to (a) in FIG. 4, a sum of a transmit power for sending the first signal and a transmit power for sending the second signal on the overlapped symbols 6, 7, and 13 is less than or equal to the maximum transmit power of the terminal device, so that communication and sensing performance of the terminal device can be ensured. This is different from the time division multiplexing. For the time division multiplexing, with reference to (a) in FIG. 4, a transmit power for sending the second signal on each of the non-overlapped symbols 1 to 5 and symbols 9 to 12 is less than or equal to the maximum transmit power of the terminal device, and a transmit power for sending the first signal on the non-overlapped symbol 8 is less than or equal to the maximum transmit power of the terminal device.

In some embodiments, S802 in which the terminal device determines a transmit power of the first signal and a transmit power of the second signal may include step 1 and step 2.

Step 1: The terminal device determines the transmit power of the first signal based on the first path loss.

For a specific implementation of step 1, refer to S702. Details are not described herein again.

Step 2: The terminal device determines the transmit power of the second signal based on the transmit power of the first signal and the maximum transmit power of the terminal device.

For example, transmit power of the second signal=min{maximum transmit power of the terminal device−transmit power of the first signal, second expected transmit power+second path loss×second path loss compensation factor+occupied resource-related power adjustment value of the second signal+closed-loop power correction value of the second signal+MCS-related power adjustment value of the second signal}. The occupied resource-related power adjustment value of the second signal is optional, the closed-loop power correction value of the second signal is optional, the MCS-related power adjustment value of the second signal is optional, and the second path loss compensation factor is optional.

An occupied resource-related power adjustment value of the second signal during spatial division multiplexing is described.

Optionally, bandwidths occupied for layered transmission of the sensing signal and the communication signal may be different, that is, quantities of RBs occupied by the sensing signal and the communication signal may be different. During the spatial division multiplexing, the occupied resource-related power adjustment value of the second signal may be different from the occupied resource-related power adjustment value of the first signal, so that the terminal device adjusts a transmit power of each layer when performing multi-layer transmission.

For example, in consideration of different requirements for communication and sensing, transmission bandwidths of the communication signal and the sensing signal may be different. The sensing signal may be sent on a full bandwidth or a large bandwidth, to improve sensing precision. The communication signal may be sent only on a part of the bandwidth.

However, in some embodiments, when a plurality of layers of PUSCHs are transmitted for a same terminal device, a same quantity of RBs are allocated to each layer, and transmit powers of the layers are the same. Consequently, the transmit power of the communication signal and the transmit power of the sensing signal cannot be adjusted.

In this way, on the overlapped time domain resource, the sum of the transmit power of the first signal and the transmit power of the second signal is less than or equal to the maximum transmit power of the terminal device, so that communication and sensing performance of the terminal device can be ensured.

In some other embodiments, S802 in which the terminal device determines a transmit power of the first signal and a transmit power of the second signal may include step 3 and step 4.

Step 3: The terminal device determines the transmit power of the second signal.

In a possible manner, the first power control indication information may further indicate the transmit power of the second signal.

Optionally, the terminal device determines the transmit power of the second signal based on the first power control indication information and the second path loss.

In other words, the transmit power of the first signal and the transmit power of the second signal may be determined by using a same power control parameter value.

Optionally, the network device may send, to the terminal device, an indication indicating that a power control parameter of the second signal is the same as a power control parameter of the first signal, or an indication indicating that the first power control indication information may indicate the transmit power of the second signal. Therefore, the terminal device may determine the transmit power of the second signal based on the first power control indication information and the second path loss.

Alternatively, for a specific implementation of step 3, refer to S802 in which the terminal device determines the transmit power of the second signal based on second power control indication information and a second path loss. Details are not described herein again.

For an implementation of the occupied resource-related power adjustment value of the second signal during the spatial division multiplexing, refer to step 2. Details are not described herein again.

Step 4: The terminal device determines the transmit power of the first signal based on the transmit power of the second signal and the maximum transmit power of the terminal device.

For example, transmit power of the first signal=min{maximum transmit power of the terminal device−transmit power of the second signal, first expected transmit power+first path loss×first path loss compensation factor+occupied resource-related power adjustment value of the first signal+closed-loop power correction value of the first signal+MCS-related power adjustment value}. The occupied resource-related power adjustment value of the first signal is optional, the closed-loop power correction value of the first signal is optional, the MCS-related power adjustment value is optional, and the first path loss compensation factor is optional.

In the foregoing two manners, the transmit power of the first signal and the transmit power of the second signal are determined in a manner of first determining the transmit power of the first signal and then determining the transmit power of the second signal or in a manner of first determining the transmit power of the second signal and then determining the transmit power of the first signal.

In some other embodiments, S802 in which the terminal device determines a transmit power of the first signal and a transmit power of the second signal may include step 5 and step 6.

Step 5: The terminal device determines the transmit power of the second signal.

For a specific implementation of step 5, refer to S802 in which the terminal device determines the transmit power of the second signal based on first power control indication information and a second path loss. Details are not described herein again.

Alternatively, for a specific implementation of step 5, refer to S802 in which the terminal device determines the transmit power of the second signal based on second power control indication information and a second path loss. Details are not described herein again.

For an implementation of the occupied resource-related power adjustment value of the second signal during the spatial division multiplexing, refer to step 2. Details are not described herein again.

Step 6: The terminal device determines the transmit power of the first signal based on the first path loss.

For a specific implementation of step 6, refer to S702. Details are not described herein again.

A sequence of performing step 5 and step 6 is not limited in this embodiment.

If the sum of the transmit power of the second signal determined in step 5 and the transmit power of the first signal determined in step 6 is less than or equal to the maximum transmit power of the terminal device (or the first power threshold), S803 may be performed.

If the sum of the transmit power required by the second signal determined in step 5 and the transmit power required by the first signal determined in step 6 is greater than the maximum transmit power of the terminal device, the required power of the first signal and the required power of the second signal may be compressed (for example, proportionally compressed), to obtain a first signal requirement compressed power corresponding to the required power of the first signal and a second signal requirement compressed power corresponding to the required power of the second signal respectively.

A sum of the first signal requirement compressed power and the second signal requirement compressed power is less than or equal to the maximum transmit power of the terminal. Final transmit power of the first signal=first signal requirement compressed power. Final transmit power of the second signal=second signal requirement compressed power.

In this way, communication and sensing performance of the terminal device can be ensured.

For example, if the first signal and the second signal exist on a scheduled PUSCH symbol, that the terminal device determines the transmit power of the first signal and the transmit power of the second signal in step 1 and step 2 may be represented by the following formulas:

$$P_{Sensing,b,f,c}(i, q_s, x) = \min\left\{\begin{array}{l} P_{sensingMAX,f,c}(i), \\ P_{O\_Sensing,b,f,c}(q_s) + 10\log_{10}(2^{\mu}\cdot M_{Sensing,b,f,c}(i)) + \alpha_{Sensing,b,f,c}(q_s)\cdot \\ \quad PL_{sensing}(i) + h_{b,f,c}(i, x) \end{array}\right\};$$

and $$P_{PUSCH,b,f,c}(i, j, q_d, l) = \min\left\{\begin{array}{l} P_{CMAX,f,c}(i) - P_{Sensing,b,f,c}(i, q_s, x), \\ P_{O\_PUSCH,b,f,c}(j) + 10\log_{10}\left(2^{\mu}\cdot M^{PUSCH}_{RB,b,f,c}(i)\right) + \alpha_{b,f,c}(j)\cdot PL_{b,f,c}(q_d) + \\ \quad \Delta_{TF,b,f,c}(i) + f_{b,f,c}(i, l) \end{array}\right\}.$$

$P_{CMAX,f,c}(i)$ represents the maximum transmit power of the terminal device. For other meanings, refer to corresponding descriptions in S702 or S802. In a possible manner, the first indication information may further include first time domain resource configuration information and second indication information. The first time domain resource configuration information may indicate a time domain resource of the first signal, and the second indication information indicates that time domain resource configuration information of the second signal is the same as the first time domain resource configuration information.

In this way, when a resource configuration of the first signal completely overlaps a resource configuration of the second signal, the resource configuration information of the second signal may not be separately sent to the terminal device, and the second indication information, for example, an enable flag (enableFlag), indicates whether time-frequency resource configuration information of the sensing signal needs to be further indicated, thereby reducing resource overheads.

Alternatively, when the resource configuration of the first signal completely overlaps the resource configuration of the second signal, the resource configuration information of the second signal and the resource configuration information of the first signal may be separately indicated. This is not limited.

When the power control apparatus 500 is a terminal device, the processor 501 in the power control apparatus 500 may be configured to determine a transmit power of the first signal and a transmit power of the second signal. Optionally, the processor 501 is further configured to perform any one or more possible processing functions of the terminal device in S802, and the transceiver 503 may be configured to perform any one or more possible receiving and sending functions of the terminal device in S802.

When the power control apparatus 600 is a terminal device, the processing module 602 in the power control apparatus 600 may be configured to determine a transmit power of the first signal and a transmit power of the second signal. Optionally, the processing module 602 may be further configured to perform any one or more possible processing functions of the terminal device in S802, and the transceiver module 601 may be configured to perform any one or more possible receiving and sending functions of the terminal device in S802.

When the power control apparatus 500 is a network device, the processor 501 in the power control apparatus 500 may be configured to perform any one or more possible processing functions of the network device in S802, and the transceiver 503 may be configured to perform any one or more possible receiving and sending functions of the network device in S802.

When the power control apparatus 600 is a network device, the processing module 602 in the power control apparatus 600 may be configured to perform any one or more possible processing functions of the network device in S802, and the transceiver module 601 may be configured to perform any one or more possible receiving and sending functions of the network device in S802.

S803: The terminal device sends the first signal based on the transmit power of the first signal, and sends the second signal based on the transmit power of the second signal.

In this way, the terminal device may send the first signal and the second signal based on the transmit powers determined in S802, so that sensing performance and communication performance of the terminal device can be ensured.

Optionally, S803 may include: the terminal device sends the first signal on the time-frequency resource of the first signal by using the determined transmit power, and sends the second signal on the time-frequency resource of the second signal by using the determined transmit power.

In a possible manner, the method provided in this embodiment may further include: S804: the terminal device obtains a sensing measurement result. For a specific implementation, refer to S704. Details are not described herein again.

In a possible manner, the method provided in this embodiment may further include: S805: the terminal device sends the sensing measurement result to the network device. Correspondingly, the network device receives the sensing measurement result from the terminal device. For a specific implementation, refer to S705. Details are not described herein again.

When the power control apparatus 500 is a terminal device, the transceiver 503 in the power control apparatus 500 may be configured to send the first signal based on the transmit power of the first signal, and send the second signal based on the transmit power of the second signal. Optionally, the processor 501 is configured to perform any one or more possible processing functions of the terminal device in S803 to S805, and the transceiver 503 may be further configured to perform any one or more possible receiving and sending functions of the terminal device in S803 to S805.

When the power control apparatus 600 is a terminal device, the transceiver module 601 in the power control apparatus 600 may be configured to send the first signal based on the transmit power of the first signal, and send the second signal based on the transmit power of the second signal. Optionally, the processing module 602 may be configured to perform any one or more possible processing functions of the terminal device in S803 to S805, and the transceiver module 601 may be further configured to perform any one or more possible receiving and sending functions of the terminal device in S803 to S805.

When the power control apparatus 500 is a network device, the processor 501 in the power control apparatus 500 may be configured to perform any one or more possible processing functions of the network device in S803, and the transceiver 503 may be configured to perform any one or more possible receiving and sending functions of the network device in S803.

When the power control apparatus 600 is a network device, the processing module 602 in the power control apparatus 600 may be configured to perform any one or more possible processing functions of the network device in S803, and the transceiver module 601 may be configured to perform any one or more possible receiving and sending functions of the network device in S803.

According to the method shown in FIG. 8, the terminal device determines the transmit power of the first signal based on the loss of the path for performing target detection, so that target detection precision of the terminal device and performance of the communication and sensing integration system of the terminal device can be improved.

It should be noted that, in the methods shown in FIG. 7 and FIG. 8, the transmit power of the first signal and/or the transmit power of the second signal are/is determined in a dynamic adjustment manner. The following describes a semi-static configuration manner of determining the transmit power of the first signal and/or the transmit power of the second signal.

In some embodiments, the method provided in this embodiment may further include: the network device determines first indication information.

Optionally, the first indication information may include the first power control indication information.

In some embodiments, the method provided in this embodiment may further include: the network device sends the first indication information to the terminal device. Correspondingly, the terminal device receives the first indication information from the network device. For a specific implementation, refer to S702-2. For a specific implementation of the first indication information, refer to S702-2.

In some embodiments, the first power control indication information may include one or more of the following: a first transmit power and a first scale factor.

It should be noted that the first power control indication information may further include the information in S702, for example, the first expected transmit power and the first maximum transmit power. In this way, after receiving the first power control indication information, the terminal device determines the transmit power in the dynamic manner by using the information in S702, and determines the transmit power in the semi-static configuration manner by using the first transmit power or the first scale factor.

For ease of description, the first expected transmit power, the first maximum transmit power, the first power adjustment value, the first path loss compensation factor, and the like in S702 are collectively referred to as a first power control parameter set below. It may be understood that the first power control parameter set may include the first expected transmit power and the first maximum transmit power, and may further include the first power adjustment value and/or the first path loss compensation factor. The first power control indication information may include one or more of the following: the first power control parameter set, the first transmit power, and the first scale factor.

In some embodiments, the first power control indication information may be transmitted by using one or more of DCI, MAC signaling, and RRC signaling.

For example, the network device sends the first power control parameter set, the first transmit power, and the first scale factor to the terminal device by using the RRC signaling. After the receiving, the terminal device determines the transmit power of the first signal by using one of the first power control parameter set, the first transmit power, and the first scale factor.

For another example, the network device sends one of the first power control parameter set, the first transmit power, and the first scale factor to the terminal device by using the DCI, the MAC signaling, or the RRC signaling. After the receiving, the terminal device determines the transmit power of the first signal.

For another example, the network device sends at least two of the first power control parameter set, the first transmit power, and the first scale factor to the terminal device by using the RRC signaling, and sends one of the two to the terminal device by using the DCI. After the receiving, the terminal device determines the transmit power of the first signal. Details are not described one by one in this embodiment.

Optionally, the network device may determine one or more first transmit powers and one or more first scale factors. In this way, when there are a plurality of first transmit powers and a plurality of first scale factors, the transmit power of the first signal may be adjusted based on different application scenarios.

A plurality of first transmit powers are used as an example. Assuming that the plurality of first transmit powers include a first transmit power 1 and a first transmit power 2, the network device may indicate, based on a current application scenario of the terminal device, the terminal device to determine the power of the first signal by using the first transmit power 1, so that sensing precision can be further improved. For example, the first power control indication information sent to the terminal device includes the first transmit power 1.

The following describes the first transmit power and the first scale factor.

For example, the first transmit power may be a value of the transmit power of the first signal.

For example, the network device may configure one or more transmit powers for the terminal device by using the RRC signaling or the MAC signaling. For example, in the RRC signaling or the MAC signaling, a sense power list information element (SENSE-PowerList information element (IE)) is newly added to configure one or more first transmit powers.

In some embodiments, the method provided in this embodiment may further include: the terminal device may determine the transmit power of the first signal based on the first transmit power.

For example, the network device sends one or more first transmit powers to the terminal device by using the RRC signaling. There are a plurality of first transmit powers. The network device indicates, to the terminal device by using the DCI, an index of a first transmit power corresponding to the first signal at a current transmission opportunity, and the terminal device uses, as the transmit power of the first signal, the first transmit power indicated by the DCI. If there is one first transmit power, the terminal device may directly use the first transmit power as the transmit power of the first signal.

Optionally, transmit power of the first signal=min{first maximum transmit power, first transmit power}.

In other words, a smaller value between the first transmit power and the first maximum transmit power is used as the transmit power of the first signal.

For a specific implementation of the first maximum transmit power, refer to S702. Details are not described herein again.

Optionally, the first scale factor may indicate a proportion of the transmit power of the first signal to the maximum transmit power of the terminal device.

For example, the maximum transmit power of the terminal device may be determined based on a capability of the terminal device.

In some other embodiments, the method provided in this embodiment n may further include: the terminal device may determine the transmit power of the first signal based on the maximum transmit power of the terminal device and the first scale factor.

For example, if the maximum transmit power of the terminal device is $P_1$, and a value of the first scale factor β is greater than or equal to 0 and less than or equal to 1, that is, $0 \le \beta \le 1$, the transmit power of the first signal is: $P=\beta\times P_1$.

For example, the network device may indicate the value of the first scale factor by using the RRC signaling, the DCI, or the MAC signaling, and an indication manner may include a bit state manner and a bitmap manner.

In the bit state manner, for a mapping relationship between a bit state and a scale factor, refer to Table 3. Table 3 is described by using an example in which a scale factor occupies three bit locations and a step between adjacent scale factors is 0.2.

TABLE 3

| Bit state | 000 | 001 | 010 | 011 | 100 | 101 | 110 | 111 |
|---|---|---|---|---|---|---|---|---|
| Scale factor | 0 | 0.2 | 0.4 | 0.6 | 0.8 | 1.0 | 1.2 | 1.4 |

For example, quantity of bits occupied by a scale factor ≥round up {log 2(M)}, where M is a quantity of scale factor values.

It should be noted that a quantity of bits occupied by a scale factor, a scale factor value corresponding to each bit state, and a step between adjacent scale factors in the bit state manner are not limited in this embodiment. Table 3 is merely an example.

In the bit state manner, for a mapping relationship between a bit state and a scale factor, refer to Table 4. Table 4 is described by using an example in which a scale factor occupies five bit locations and a step between adjacent scale factors is 0.2.

TABLE 4

| Bit state | 000001 | 000010 | 000100 | 001000 | 010000 | 100000 |
|---|---|---|---|---|---|---|
| Scale factor | 0 | 0.2 | 0.4 | 0.6 | 0.8 | 1.0 |

For example, a quantity of bits occupied by a scale factor is greater than or equal to a quantity of scale factor values.

It should be noted that a quantity of bits occupied by a scale factor, a scale factor value corresponding to each bit state, and a step between adjacent scale factors in the bit state manner are not limited in this embodiment. Table 4 is merely an example.

For a specific implementation of the first maximum transmit power, refer to S702. Details are not described herein again.

In the semi-static configuration manner, if the time domain resource of the first signal and the time domain resource of the second signal completely or partially overlap, a specific implementation of obtaining the transmit power of the second signal on the overlapped time domain resource may be similar to that of determining the transmit power of the second signal in step 2. A difference is that the transmit power of the first signal is replaced with the transmit power of the first signal that is obtained in the semi-static manner. For ease of description, the transmit power of the first signal that is obtained in the semi-static manner is referred to as a semi-static first signal transmit power.

For example, transmit power of the second signal=min{maximum transmit power of the terminal device−semi-static first signal transmit power, second expected transmit power+second path loss×second path loss compensation factor+occupied resource-related power adjustment value of the second signal+closed-loop power correction value of the second signal+MCS-related power adjustment value of the second signal}. For specific implementations of the formula and the parameters in the formula, refer to S802. Details are not described herein again.

When the power control apparatus 500 is a terminal device, the processor 501 in the power control apparatus 500 may be configured to perform any one or more possible processing functions of the terminal device in the semi-static manner, and the transceiver 503 may be configured to perform any one or more possible receiving and sending functions of the terminal device in the semi-static manner.

When the power control apparatus 600 is a terminal device, the processing module 602 in the power control apparatus 600 may be configured to perform any one or more possible processing functions of the terminal device in the semi-static manner, and the transceiver module 601 may be configured to perform any one or more possible receiving and sending functions of the terminal device in the semi-static manner.

When the power control apparatus 500 is a network device, the processor 501 in the power control apparatus 500 may be configured to perform any one or more possible processing functions of the network device in the semi-static manner, and the transceiver 503 may be configured to perform any one or more possible receiving and sending functions of the network device in the semi-static manner.

When the power control apparatus 600 is a network device, the processing module 602 in the power control apparatus 600 may be configured to perform any one or more possible processing functions of the network device in the semi-static manner, and the transceiver module 601 may be further configured to perform any one or more possible receiving and sending functions of the network device in the semi-static manner.

An embodiment provides a communications system. The communications system includes a terminal device and a network device. The terminal device is configured to perform the actions of the terminal device in the foregoing method embodiment. For a specific execution method and process, refer to the foregoing method embodiment. Details are not described herein again.

The network device is configured to perform the actions of the network device in the foregoing method embodiment. For a specific execution method and process, refer to the foregoing method embodiment. Details are not described herein again.

An embodiment provides a chip system. The chip system includes a logic circuit and an input/output port. The logic circuit may be configured to implement the processing function related to the power control method provided in the embodiment, and the input/output port may be configured to implement the receiving and sending functions related to the power control method provided in the embodiment.

For example, the input port may be configured to implement the receiving function related to the power control method provided in the embodiment, and the output port may be configured to implement the sending function related to the power control method provided in the embodiment.

For example, the processor in the power control apparatus 500 may be configured to perform, for example, but not limited to, baseband-related processing, and the transceiver in the power control apparatus 500 may be configured to perform, for example, but not limited to, radio frequency receiving and sending. The foregoing components may be separately disposed on chips that are independent of each other, or at least some or all of the components may be disposed on a same chip. For example, the processor may be further divided into an analog baseband processor and a digital baseband processor. The analog baseband processor and the transceiver may be integrated on a same chip, and the digital baseband processor may be disposed on an independent chip. With continuous development of integrated circuit technologies, more components may be integrated on a same chip. For example, the digital baseband processor may be integrated on a same chip with a plurality of application processors (for example, but not limited to, a geometric processor and a multimedia processor). The chip may be referred to as a system-on-a-chip (system-on-a-chip). Whether components are independently disposed on different chips or are integrated and disposed on one or more chips can depend on specific requirements of a product design. This embodiment imposes no limitation on specific implementations of the foregoing components.

In a possible manner, the chip system further includes a memory, and the memory is configured to store program instructions and data for implementing the functions related to the power control method provided in the embodiment.

The chip system may include a chip, or may include a chip and another discrete component.

An embodiment provides a non-transitory computer-readable storage medium. The non-transitory computer-readable storage medium includes a computer program or instructions, and when the computer program or the instructions are run on a computer, the power control method provided in the embodiment is performed.

An embodiment provides a computer program product. The computer program product includes a computer program or instructions, and when the computer program or the instructions are run on a computer, the power control method provided in the embodiment is performed.

It should be understood that the processor in this embodiment may be a CPU, or the processor may be another general-purpose processor, a DSP, an application-specific integrated circuit (ASIC), a programmable gate array or another programmable logic device, a discrete gate or transistor logic device, a discrete hardware component, or the like. The general-purpose processor may be a microprocessor, or the processor may be any conventional processor or the like.

It should be further understood that the memory in this embodiment may be a volatile memory or a nonvolatile memory, or may include a volatile memory and a nonvolatile memory. The nonvolatile memory may be a read-only ROM, a programmable read-only memory (programmable ROM, PROM), an erasable programmable read-only memory (erasable PROM, EPROM), an EEPROM, or a flash memory. The volatile memory may be a random access memory, and may serve as an external cache. By way of example, and not limitation, many forms of random access memories may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

All or some of the foregoing embodiments may be implemented using software, hardware (for example, circuits), firmware, or any combination thereof. When software is used to implement embodiments, the foregoing embodiments may be implemented completely or partially in a form of a computer program product. The computer program product includes one or more computer instructions or computer programs. When the program instructions or the computer programs are loaded and executed on a computer, the procedure or functions according to embodiments are all or partially generated. The computer may be a general-purpose computer, a special-purpose computer, a computer network, or other programmable apparatuses. The computer instructions may be stored in a non-transitory computer-readable storage medium or may be transmitted from a non-transitory computer-readable storage medium to another non-transitory computer-readable storage medium. For example, the computer instructions may be transmitted from a website, computer, server, or data center to another website, computer, server, or data center in a wireless (for example, infrared, radio, and microwave, or the like) manner. The non-transitory computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that a term "and/or" describes only an association relationship between associated objects, and indicates that three relationships may exist. For example, A and/or B may indicate the following three cases: only A exists, both A and B exist, and only B exists, where A and B may be singular or plural. In addition, a character "/" may indicate an "or" relationship between associated objects, or may indicate an "and/or" relationship. A specific meaning depends on the context.

In the embodiments, "at least one" means one or more, and "a plurality of" means two or more. In addition, "at least one of the following items (pieces)" or a similar expression thereof means any combination of these items, including any combination of singular items (pieces) or plural items (pieces). For example, at least one of a, b, or c may indicate: a, b, c, a and b, a and c, b and c, or a, b, and c, where a, b, and c may be singular or plural.

It should be understood that sequence numbers of the foregoing processes do not mean execution sequences in various embodiments. The execution sequences of the processes should be determined based on functions and internal logic of the processes, and should not be construed as any limitation on the implementation processes of embodiments.

A person of ordinary skill in the art may be aware that, in combination with the examples described in embodiments, units and algorithm steps may be implemented by using electronic hardware or a combination of computer software and electronic hardware. Whether the functions are performed by using hardware or software depends on particular applications and design constraints of the solutions. A person skilled in the art may use different methods to implement the described functions for each particular application, but it should not be considered that the implementation goes beyond the scope of the embodiments.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In several embodiments provided, it should be understood that the system, apparatus, and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, that is, may be located in one place, or may be distributed on a plurality of network units. Some or all of the units may be selected based on actual requirements to achieve the objectives of the solutions of embodiments.

In addition, functional units in embodiments may be integrated into one processing unit, or each of the units may exist alone physically, or two or more units are integrated into one unit.

When the functions are implemented in the form of a software functional unit and sold or used as an independent product, the functions may be stored in a non-transitory computer-readable storage medium. Based on such an understanding, the solutions of the embodiments essentially, or the part making contributions, or some of the solutions may be implemented in a form of a software product. The computer software product is stored in a storage medium, and includes several instructions for instructing a computer device (which may be a personal computer, a server, a network device, or the like) to perform all or some of the steps of the methods described in embodiments. The foregoing storage medium includes any medium that can store program code, such as a USB flash drive, a removable hard disk, a ROM, a RAM, a magnetic disk, or an optical disc.

The foregoing descriptions are merely specific implementations of the embodiments, but are not intended to limit their scope. Any variation or replacement readily figured out by a person skilled in the art shall fall within the scope of the embodiments.

What is claimed is:

1. A power control method, performed by a terminal device, comprising:

determining a first path loss, wherein the first path loss is a path loss of a detection link, and the detection link is a round-trip link between the terminal device and at least one object;

determining a transmit power of a first signal based on the first path loss;

determining a transmit power of a second signal;

sending the first signal based on the transmit power of the first signal; and sending the second signal based on the transmit power of the second signal, wherein a time domain resource of the first signal and a time domain resource of the second signal completely or partially overlap, and on the overlapped time domain resource, a sum of the transmit power of the first signal and the transmit power of the second signal is less than or equal to a maximum transmit power of the terminal device.

2. The power control method according to claim 1, wherein the first path loss is determined based on first information, a signal from the terminal device, and/or a signal from a device other than the terminal device, wherein the first information comprises one or more of: reference path loss information, a first path loss correction value, or distance information.

3. The power control method according to claim 2, wherein the first path loss being determined by the terminal device based on a signal from the terminal device comprises:

the first signal is transmitted at a current transmission opportunity, and the first path loss is determined based on a path loss obtained at one or more transmission opportunities before the current transmission opportunity.

4. The power control method according to claim 1, wherein the determining of the transmit power of the first signal based on the first path loss comprises:

determining the transmit power of the first signal based on first power control indication information and the first path loss, wherein the first power control indication information comprises a first maximum transmit power and a first expected transmit power, the first maximum transmit power indicates a maximum power for sending the first signal, the first maximum transmit power is less than or equal to the maximum transmit power of the terminal device, the transmit power of the first signal is less than or equal to the first maximum transmit power, and the first expected transmit power indicates an expected transmit power that meets a target detection requirement of the terminal device.

5. The power control method according to claim 4, further comprising:

receiving first indication information from a network device, wherein the first indication information comprises the first power control indication information.

6. The power control method according to claim 5, wherein the first indication information further comprises second power control indication information, and the second power control indication information indicates a transmit power of a second signal.

7. A power control method, performed by a network device, comprising:

determining first indication information, wherein the first indication information comprises first power control indication information, the first power control indication information is for a terminal device to determine a transmit power of a first signal based on the first power control indication information and a first path loss, the first path loss is a path loss of a detection link, and the detection link is a round-trip link between the terminal device and at least one object; and sending the first indication information to the terminal device, wherein the first indication information further comprises second power control indication information, and the second power control indication information indicates a transmit power of a second signal, wherein the first indication information further includes first time domain resource configuration information and second time domain resource configuration information, the first time domain resource configuration information is for the terminal device to determine a time domain resource of the first signal, and the second time domain resource configuration information is for the terminal device to determine a time domain resource of the second signal, and wherein a time domain resource of the first signal and a time domain resource of the second signal completely or partially overlap, and on the overlapped time domain resource, a sum of the transmit power of the first signal and the transmit power of the second signal is less than or equal to a maximum transmit power of the terminal device.

8. The power control method according to claim 7, further comprising:

sending first information to the terminal device, wherein the first information comprises one or more of the following: reference path loss information, a first path loss correction value, or distance information, and the first information indicates the first path loss.

9. The power control method according to claim 7, wherein the first power control indication information comprises a first maximum transmit power and a first expected transmit power, the first maximum transmit power indicates a maximum power for sending the first signal, the first maximum transmit power is less than or equal to a maximum transmit power of the terminal device, the transmit power of the first signal is less than or equal to the first maximum transmit power, and the first expected transmit power indicates an expected transmit power that meets a target detection requirement of the terminal device.

10. A power control apparatus, for a terminal device, comprising:

at least one processor; and a memory storing programming instructions for execution by the at least one processor, the programming instructions causing the power control apparatus to perform operations comprising:

determining a first path loss, wherein the first path loss is a path loss of a detection link, and the detection link is a round-trip link between the terminal device and at least one object;

determining a transmit power of a first signal based on the first path loss;

determining a transmit power of a second signal;

sending the first signal based on the transmit power of the first signal; and sending the second signal based on the transmit power of the second signal, wherein a time domain resource of the first signal and a time domain resource of the second signal completely or partially overlap, and on the overlapped time domain resource, a sum of the transmit power of the first signal and the transmit power of the second signal is less than or equal to a maximum transmit power of the terminal device.

11. The power control apparatus according to claim 10, wherein the first path loss is determined based on first information, a signal from the terminal device, and/or a signal from a device other than the terminal device, and the first information comprises one or more of the following: reference path loss information, a first path loss correction value, or distance information.

12. The power control apparatus according to claim 11, wherein the first path loss being determined by the terminal device based on a signal from the terminal device comprises:

the first signal is transmitted at a current transmission opportunity, and the first path loss is determined based on a path loss obtained at one or more transmission opportunities before the current transmission opportunity.

13. The power control apparatus according to claim 10, wherein determining the transmit power of the first signal based on the first path loss comprises:

determining the transmit power of the first signal based on first power control indication information and the first path loss, wherein the first power control indication information comprises a first maximum transmit power and a first expected transmit power, the first maximum transmit power indicates a maximum power for sending the first signal, the first maximum transmit power is less than or equal to the maximum transmit power of the terminal device, the transmit power of the first signal is less than or equal to the first maximum transmit power, and the first expected transmit power indicates an expected transmit power that meets a target detection requirement of the terminal device.

14. The power control apparatus according to claim 13, wherein the operations further comprise:

receiving first indication information from a network device, wherein the first indication information comprises the first power control indication information.

15. The power control apparatus according to claim 14, wherein the first indication information further comprises second power control indication information, and the second power control indication information indicates a transmit power of a second signal.

16. A power control apparatus, for a network device, comprising:

at least one processor; and a memory storing programming instructions for execution by the at least one processor, the programming instructions causing the power control apparatus to perform operations comprising:

determining first indication information, wherein the first indication information comprises first power control indication information, the first power control indication information is for a terminal device to determine a transmit power of a first signal based on the first power control indication information and a first path loss, the first path loss is a path loss of a detection link, and the detection link is a round-trip link between the terminal device and at least one object; and sending the first indication information to the terminal device, wherein the first indication information further comprises second power control indication information, and the second power control indication information indicates a transmit power of a second signal, wherein the first indication information further includes first time domain resource configuration information and second time domain resource configuration information, the first time domain resource configuration information is for the terminal device to determine a time domain resource of the first signal, and the second time domain resource configuration information is for the terminal device to determine a time domain resource of the second signal, and wherein a time domain resource of the first signal and a time domain resource of the second signal completely or partially overlap, and on the overlapped time domain resource, a sum of the transmit power of the first signal and the transmit power of the second signal is less than or equal to a maximum transmit power of the terminal device.

17. The power control apparatus according to claim 16, wherein the operations further comprise:

sending first information to the terminal device, wherein the first information comprises one or more of the following: reference path loss information, a first path loss correction value, or distance information, and the first information indicates the first path loss.

18. The power control apparatus according to claim 16, wherein the first power control indication information comprises a first maximum transmit power and a first expected transmit power, the first maximum transmit power indicates a maximum power for sending the first signal, the first maximum transmit power is less than or equal to a maximum transmit power of the terminal device, the transmit power of the first signal is less than or equal to the first maximum transmit power, and the first expected transmit power indicates an expected transmit power that meets a target detection requirement of the terminal device.

* * * * *